(12) United States Patent
Bejcek

(10) Patent No.: US 12,477,975 B2
(45) Date of Patent: Nov. 25, 2025

(54) DRIVE-BY-WIRE SYSTEM FOR VEHICLE, ZERO-TURN-RADIUS LAWNMOWER INCLUDING SAME, AND DRIVE-BY-WIRE SYSTEM FOR LAWNMOWER

(71) Applicant: Honda Motor Co., Ltd., Tokyo (JP)

(72) Inventor: Andrew Edwin Bejcek, Saline, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 645 days.

(21) Appl. No.: 17/942,421

(22) Filed: Sep. 12, 2022

(65) Prior Publication Data

US 2024/0081175 A1   Mar. 14, 2024

(51) Int. Cl.
| | | |
|---|---|---|
| *A01D 34/00* | (2006.01) | |
| *A01D 34/64* | (2006.01) | |
| *A01D 75/18* | (2006.01) | |
| *A01D 101/00* | (2006.01) | |

(52) U.S. Cl.
CPC .......... *A01D 34/006* (2013.01); *A01D 34/64* (2013.01); *A01D 75/185* (2013.01); *A01D 2101/00* (2013.01)

(58) Field of Classification Search
None
See application file for complete search history.

(56) References Cited

U.S. PATENT DOCUMENTS

| | | | |
|---|---|---|---|
| 6,021,373 A | 2/2000 | Zuercher et al. | |
| 6,044,632 A | 4/2000 | Schmalz et al. | |
| 6,173,233 B1 | 1/2001 | Janutka et al. | |
| 6,808,032 B2 | 10/2004 | Wuertz et al. | |
| 7,953,526 B2 | 5/2011 | Durkos et al. | |
| 8,522,901 B1 | 9/2013 | VanLue | |
| 8,668,036 B2 | 3/2014 | Wyatt et al. | |
| 9,491,903 B2 | 11/2016 | Dwyer | |
| 9,679,419 B2 | 6/2017 | Dwyer | |
| 9,841,768 B2 | 12/2017 | Hiramatsu et al. | |
| 10,638,661 B2 | 5/2020 | Kawai et al. | |
| 10,814,887 B1 | 10/2020 | Sutton, Jr. | |
| 11,672,201 B2 * | 6/2023 | Zeiler | B62D 21/02 56/6 |
| 2006/0277884 A1 | 12/2006 | Bucher | |
| 2016/0251003 A1 * | 9/2016 | Weihl | B60T 7/12 701/70 |

(Continued)

*Primary Examiner* — Jelani A Smith
*Assistant Examiner* — Davin Seol
(74) *Attorney, Agent, or Firm* — KENEALY VAIDYA LLP

(57) ABSTRACT

A drive-by-wire system can include pair of inputs and a controller configured to process signals from the inputs in a first mode and process the same signals differently in a second mode. The controller can be configured to, in the first mode, drive a first motor at a speed and direction that corresponds to the position of the first input and drive a second motor at a speed and direction that corresponds to the position of the second input and, in the second mode, drive the first motor and the second motor in the same direction and at the same speed using the first drive signal when the controller receives a second neutral signal from the second input, and drive the first motor and the second motor at different speeds and/or directions when the controller receives the first drive signal and the second drive signal.

20 Claims, 9 Drawing Sheets

(56) References Cited

U.S. PATENT DOCUMENTS

| | | |
|---|---|---|
| 2017/0135277 A1 | 5/2017 | Hiramatsu et al. |
| 2018/0160619 A1 | 6/2018 | Manji et al. |
| 2020/0021210 A1 | 1/2020 | Schulenberg et al. |
| 2022/0354048 A1 * | 11/2022 | Wendt .................. B60K 7/0007 |

* cited by examiner

DRIVE-BY-WIRE SYSTEM FOR VEHICLE, ZERO-TURN-RADIUS LAWNMOWER INCLUDING SAME, AND DRIVE-BY-WIRE SYSTEM FOR LAWNMOWER

BACKGROUND

The disclosed subject matter relates to a self-propelled vehicle. More particularly, the disclosed subject matter relates to methods and apparatus of a drive-by-wire system for a vehicle.

A vehicle can include an electric motor, an internal combustion engine or a hybrid system that includes an electric motor and an internal combustion engine. Vehicles can be specialized for use on an improved path such as, but not limited to, a paved surface or on an unimproved path or on an unmarked path. Some vehicles can be used on both an improved path and an unimproved path.

Vehicles can be propelled by at least a pair of wheels or by one or more pairs of tracks where each drive wheel/track is driven by a respective motor out of a pair of motors. These vehicles can include a pair of operator inputs—a respective one for each drive motor. The pair of operator inputs can permit an operator to control each drive motor individually to cause forward travel, reverse travel and facilitate turning of the vehicle. Each of the operator inputs can include a control lever and a mechanical linkage connected to the respective drive motor and control lever. Each mechanical linkage can transmit the direction of movement of the respective control lever to a mechanical actuator that translates the movement of the control lever into a drive direction (i.e., forward or reverse) and the magnitude of movement into a rotational speed at which the respective motor is driven. Driving the motors in the same direction and at the same speed can cause the vehicle to travel in a straight path. Driving the motors in the same direction but at different speeds can cause the vehicle to travel in a curved path. Driving one of the drive motors in a forward direction and the other drive motor in a reverse direction can permit the vehicle to spin about its yaw axis. A vehicle that can spin about its yaw axis can be referred to as a zero-turn-radius ("ZTR") vehicle or a zero turn vehicle.

SUMMARY

Some embodiments are directed to a drive-by-wire system for a vehicle including a first motor and a second motor. The drive-by-wire system can include a first operator input configured to transmit one of a first drive signal and a first neutral signal, a second operator input configured to transmit one of a second drive signal and a second neutral signal, and a controller in electrical communication with the first operator input and the second operator input. The controller can be configured to, in a first mode, drive the first motor at a first speed and in a first direction that correspond directly to the first drive signal when the controller receives the first drive signal, and drive the second motor at a second speed and in a second direction that correspond directly to the second drive signal when the controller receives the second drive signal. The controller can be configured to, in a second mode, drive the first motor and the second motor in a same direction and at a same speed when the controller receives the first drive signal and the second neutral signal, and drive the first motor and the second motor at different speeds and in a same direction when the controller receives the first drive signal and the second drive signal.

Some embodiments are directed to a drive-by-wire system for a lawnmower including a first motor and a second motor. The drive-by-wire system can include a first operator input, a second operator input, a mode switch, and a controller. The first operator input can be configured to transmit a first signal and the second operator input can be configured to transmit a second signal. The mode selector can be configured to output a mode signal. The controller can be in electrical communication with mode switch, the first handle and the second handle. The controller can be configured to determine one of a plurality of first conditions based on the first signal. The plurality of first conditions can include a first neutral condition and a plurality of first drive conditions. The controller can also be configured to determine one of a plurality of second conditions based on the second signal. The plurality of second conditions can include a second neutral condition and a plurality of second drive conditions. The controller can also be configured to determine whether the mode signal is indicative of a first mode request or a second mode request, operate in a first mode when the controller determines that the mode signal corresponds to the first mode request, and operate in a second operation mode when the controller determines that the mode signal corresponds to the first mode request. In the first mode, the controller can be configured to: 1) drive the first motor at a first speed and in a first direction that correspond directly to the first drive signal when the controller determines one of the first drive conditions; 2) drive the second motor at a second speed and in a second direction that correspond directly to the second drive signal when the controller determines one of the second drive conditions; 3) cause the first motor to be idle when the controller determines the first neutral condition; and 4) cause the second motor to be idle when the controller determines the second neutral condition. In the second mode, the controller can be configured to: 1) drive the first motor and the second motor in a same direction and at a same speed when the controller determines the second neutral condition and one of the first drive conditions; 2) drive the first motor at a first turning speed and in the same direction and the second motor at second turning speeds and in one of the same direction and an opposite direction when the controller determines one of the first drive conditions and one of the second drive conditions; and 3) cause the first motor and the second motor to be idle when the controller determines the first neutral condition.

Some embodiments are directed to a drive-by-wire system for a lawnmower including a first motor selectively and a second motor. The drive-by-wire system can a first handle, a second handle, and controller. Each of the first and second handles can be movable into a first range, a second range, and a neutral position that is separate from the first range and the second range. The controller can be in electrical communication with the first handle and the second handle, and configured to, in a first operation mode, drive the first motor when the first handle is in the first range or the second range, drive the second motor when the second handle is in the first range or the second range, cause the first motor to be idle when the first handle is in the neutral position, and cause the second motor to be idle when the second handle is in the neutral position. The controller can be, in a second operation mode, drive the first motor and the second motor when the second handle is the neutral position and the first handle is in the first range or the second range.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

The mechanical structures of the operator inputs of a ZTR vehicle can limit each operator lever to control only the respective drive motor. Thus, in order to travel in a straight line, both operator levers should be moved to equal respective positions so that both drive motors output the same speed. It can be difficult for a novice operator to execute the precise manipulation of the operator levers that is needed to achieve a straight path of travel. Further, the operator's arm(s) and/or hand(s) can be jostled as the vehicle travels along uneven or bumpy terrain. This jostled movement can be transmitted to the operator inputs, thus hindering the operator's ability to maintain a straight path of travel for the vehicle.

It may be valuable for some work vehicles, such as but not limited to lawnmowers, to be driven precisely in a straight path, or at least in a path that an observer can perceive as being straight. In an effort to overcome the difficulties for an operator to maintain a straight path of travel, ZTR lawnmowers can include a foot-operated pedal that the operator can press to engage a straight line tracking system. The pedal can relieve the requirement that the operator precisely control the lever to maintain a straight path of travel for the vehicle. When the operator wants to turn, the operator can disengage the pedal to disengage the straight line tracking system. However, if the operator moves the operator inputs beyond a certain differential input, the ZTR lawnmower can begin to turn regardless of whether the straight line tracking system is engaged or disengaged. Thus, the foot pedal straight tracking system can allow inadvertent operator inputs to override the straight path control and cause the ZTR lawnmower to inadvertently stray from a straight path of travel.

Figure 1:
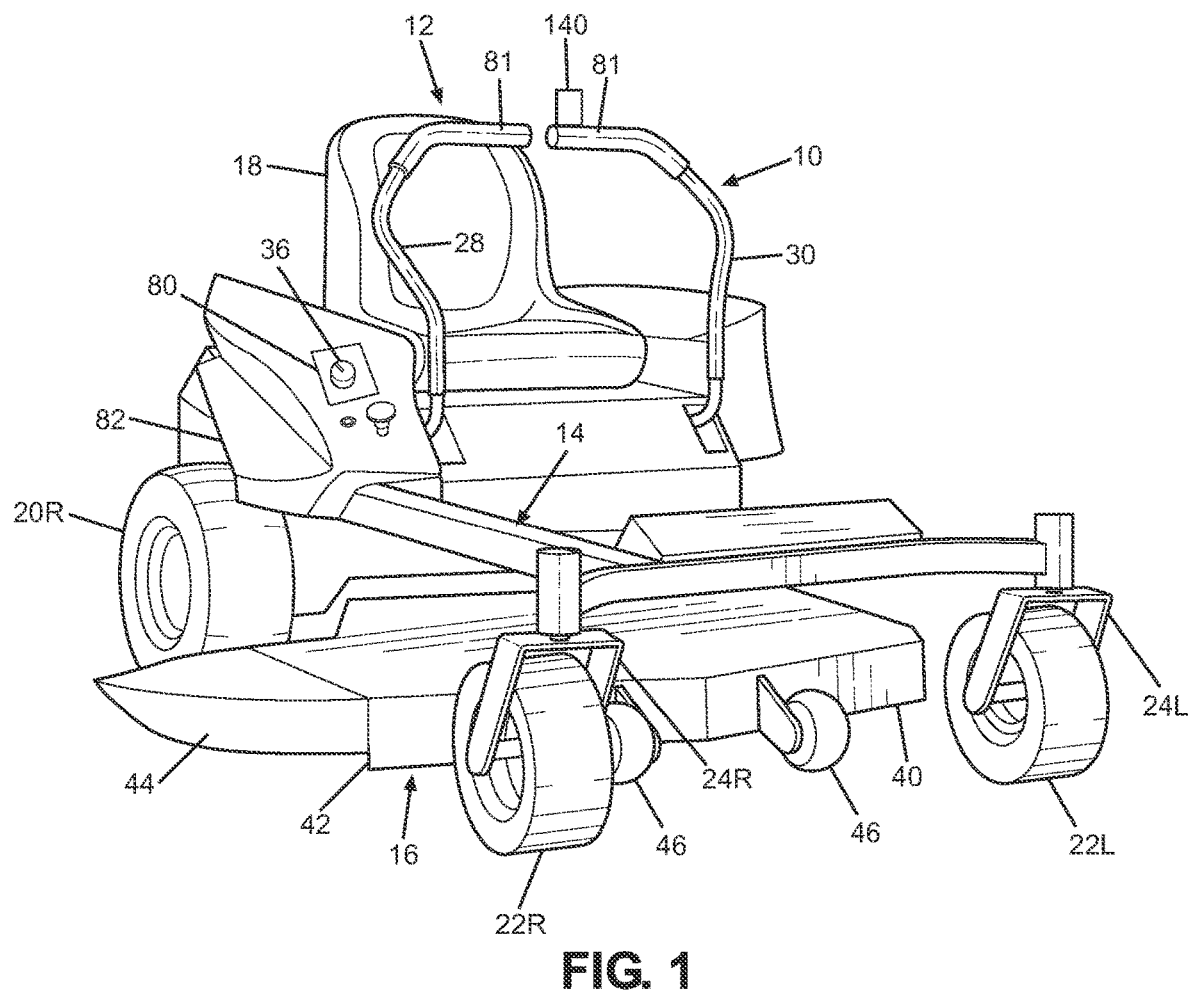
FIG. 1 is a perspective view of a lawnmower that includes a drive-by-wire system made in accordance with principles of the disclosed subject matter.

It can be advantageous to replace the mechanical linkage between the operator inputs and the respective drive motor with a drive-by-wire system in a vehicle, such as but not limited to a skid-steer vehicle, a tracked vehicle, or a lawnmower. FIG. 1 illustrates an embodiment of a drive-by-wire system 10 for a lawnmower 12 made in accordance with principles of the disclosed subject matter. The drive-by-wire system 10 can selectively operate in a first mode or in a second mode. The first mode can be configured to emulate a conventional mechanical linkage between the operator input and the respective drive motor. In the second mode, the drive-by-wire system 10 can simplify the input by the operator to cause the lawnmower 12 to travel in a straight path and easily allow the operator to maintain a straight path of travel regardless of the terrain over which the lawnmower 12 is travelling. Further, the drive-by-wire system 10 can improve operator comfort and reduce operator fatigue by automating certain operations, such as but not limited to auto-turning. In either the first mode or the second mode, the drive-by-wire system 10 can enhance safe operation, provide or enhance obstacle detection and avoidance, and provide or enhance emergency stopping capability. Further still, the drive-by-wire system 10 can be applied to lawnmower 12 that is powered by an internal combustion engine as well as to a lawnmower 12 that is powered by a battery.

Some work vehicles, such as but not limited to lawnmowers, might lack an information display (also referred to as a dashboard or an instrument cluster or a combination meter or a meter) that provides the operator with information regarding the operating parameter(s) of the work vehicle. The drive-by-wire system 10 can be configured to present the operator with audible and/or visual information regarding the operational status of the lawnmower 12 such as but not limited to turning speed, turning direction, tilt angle, and obstacle location. Thus, the drive-by-wire system 10 can increase the operator's awareness of one or more operational parameter(s) of the lawnmower 12.

Figure 2:
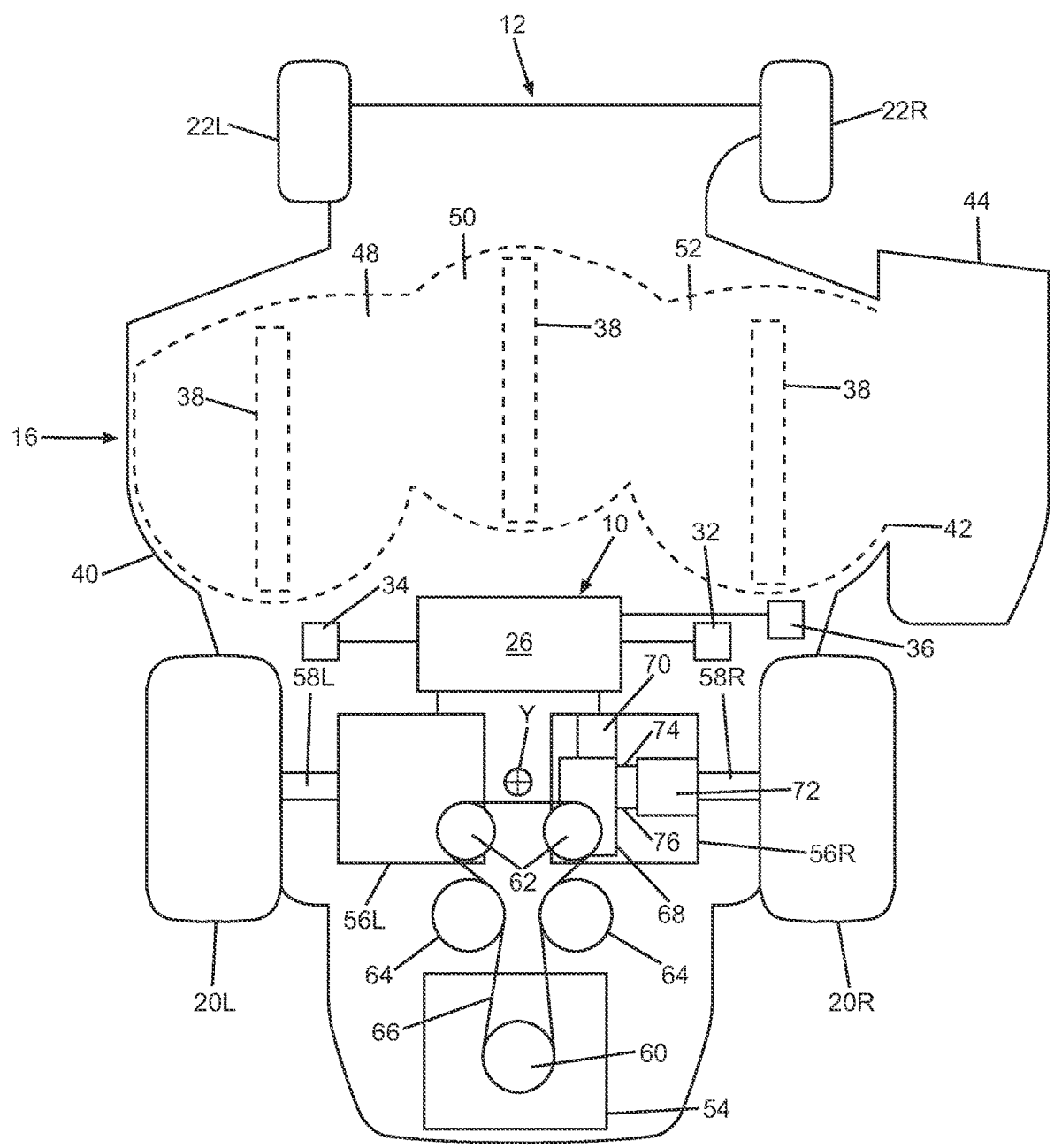
FIG. 2 is a schematic view of the lawnmower of FIG. 1.

FIG. 2 is a schematic representation of the lawnmower 12 of FIG. 1. Referring to FIGS. 1 and 2 collectively, the lawnmower 12 can include a main frame 14, a mower deck 16, a seat 18, a pair of drive wheels 20L, 20R, a pair of caster wheels 22L, 22R and a pair of front forks 24L, 24R. The left drive wheel 20L is obstructed from view in FIG. 1. The drive-by-wire system 10 can include a controller 26, a pair of control levers 28, 30, a pair of sensors 32, 34 and a mode selector 36.

Referring to FIG. 1, the main frame 14 can support the seat 18 and the control levers 28, 30. The mower deck 16 can be suspended from the main frame 14. Each of the drive wheels 20L, 20R can be connected to the main frame 14. The main frame 14 can pivotally support the front forks 24L, 24R, and the front forks 24L, 24R can rotatably support the caster wheels 22L, 22R.

The mower deck 16 can be referred to as a deck, a deck assembly, a blade deck, a cutter housing, or a cutter housing assembly. Returning to FIGS. 1 and 2 collectively, the mower deck 16 can house a plurality of blades 38 and include a housing 40, a discharge opening 42, a discharge chute guard 44 and a plurality of wheel assemblies 46. The wheel assemblies 46 can keep the mower deck 16 at a predetermined minimum height above the ground over which the lawnmower 12 traverses. Each blade assembly 38 can include one blade or a pair of blades rotationally offset with respect to one another. The housing 40 can include a plurality of cutting chambers 48, 50, 52 and each blade assembly 38 can rotate within its respective cutting chamber 48 or 50 or 52. The discharge chute guard 42 can be pivotally mounted to the deck 16 adjacent to and above the discharge opening 40.

Referring to FIG. 2, the lawnmower 12 can include a power source 54, a pair of hydrostatic transmissions ("HST") 56L, 56R and a pair of driveshafts 58L, 58R. The power source 54 can include a drive output pulley 60 and each of the HSTs 56L, 56R can include an input pulley 62. The lawnmower 12 can include a pair of idler pulleys 64 and a belt 66 that connects the output pulley 60 to the input pulleys 62 and passes along each of the idler pulleys 64. One of the idler pulleys 64 can be mounted on a tension arm (not shown) so that the one of the idler pulleys 64 can maintain a predetermined tension on the belt 66.

The power source 54 can include a second output pulley (not shown) and the mower deck 16 can include a plurality of driven pulleys (not shown) that are each rotationally connected to a respective one of the blade assemblies 38. The second output pulley can be coaxial with the output pulley 60. The driven pulleys can be coaxial with the respective one of the blade assemblies 38 and rotatably mounted on the top of the mower deck 16. The mower deck 16 can include a blade drive belt (not shown) that is connected to the second output pulley and each of the driven pulleys.

The power source 54 can be an internal combustion engine, an electric motor or a hybrid of an internal combustion engine and an electric motor. The power source configured as an internal combustion engine or a hybrid power source can have the engine output power source axis oriented in the vertical direction V of the lawnmower 10.

The HSTs 56L, 56R can have the same or similar structure and details of the HSTs 56L, 56R are described with respect to the right HST 56R. The details of the left HST 56L are omitted from FIG. 2 for simplicity and clarity of the drawing. The right HST 56R can include a hydraulic pump 68, an actuator 70, a hydraulic motor 72 and a pair of hydraulic lines 74, 76.

The pump 68 can be connected to and driven by a respective one of the input pulleys 62. The hydraulic lines 74, 76 can fluidly couple the pump 68 and the motor 72 such that hydraulic fluid flows out of the pump 68, into and through the motor 72, and returns to the pump 68. The actuator 70 can be configured to cause the pump 68 to circulate the fluid to and from the motor 72 in a first direction, or in a second direction. The actuator 70 can terminate the flow of the hydraulic fluid between the pump 68 and the motor 72. For example, when the pump 68 outputs fluid to the motor 72 via the first line 74 and the motor 68 returns the fluid via the second line 76, the motor 72 can drive the right wheel 20R in a forward direction. Conversely, when the pump 68 outputs fluid to the motor 72 via the second line 76 and the motor 68 returns the fluid via the first line 74, the motor 72 can drive the right wheel 20R in a reverse direction. The actuator 70 can be configured to cause the pump 68 to vary the flow rate of hydraulic fluid flowing into the motor 72 to vary the speed at which the motor 72 drives the right wheel 20R.

The motor 72 can be connected to and selectively drive the respective driveshaft 58L, 58R, which in turn, drives the corresponding wheel 20L, 20R in a forward direction or a reverse direction depending on an input from the respective one of the control levers 28, 30 located adjacent the lawnmower's seat 18. The belt 66 can be configured to provide a constant rotational input to the input pulleys 62 of each HST 56L, 56R. Thus, both the speed and the direction of rotation of each wheel 20L, 20R can be controlled by the controller 26 based on inputs to the sensors 32, 34 via the control levers 28, 30. The controller 26 can be electrically connected to the actuator 70 of each of the HSTs 56L, 58L to cause the actuator 70 to selectively vary the speed and direction in which the fluid exiting the hydraulic pump 68 drives the hydraulic motor 72. Each of the actuators 70 can include an electric, electronic or electro-mechanical servo that is connected to mechanical structure(s) that can vary the flow rate and which of the lines 74, 76 the fluid exits the pump 68. The servo can be any appropriate device such as but not limited to a rotary motor or a solenoid. The mechanical structure can be any appropriate structure such as but not limited to a swashplate or a valve body.

Figure 3:
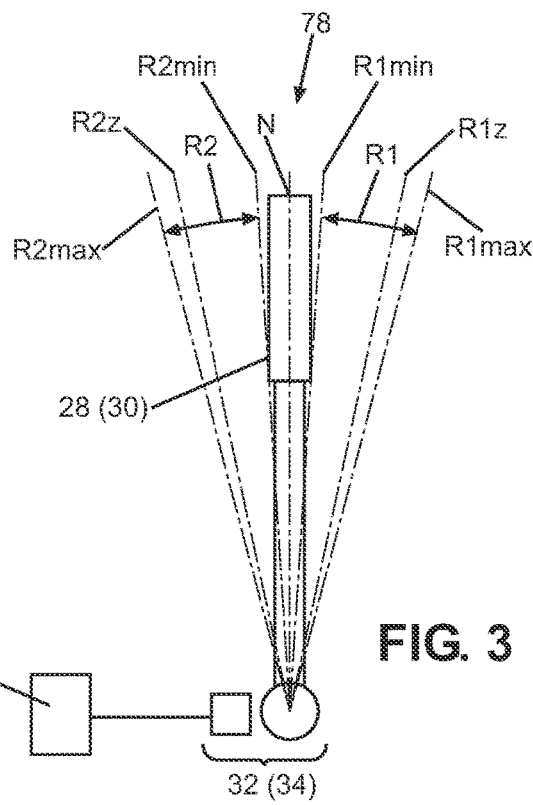
FIG. 3 is a side view of an operator input of the lawnmower of FIG. 1 and shows in phantom a plurality of positions of a control lever of the operator input.

Referring to FIGS. 1-3 collectively, each of the control levers 28, 30 and the respective one of the sensors 32, 34 can be collectively referred to as an operator input 78. Each of the control levers 28, 30 can include a handle 79. The handle 79 can also be referred to as a hand grip or a grip and the control levers 28, 30 can also be referred to as control handles, drive handles, or drive levers. The operator can use the control levers 28, 30 to signal the controller 26 in which direction and at what speed the operator desires the controller 26 to cause the HSTs 56L, 56R to propel the lawnmower 12. The operator can use the control levers 28, 30 to signal the controller 26 to stop travel of the lawnmower 12.

When the controller 26 drives both HSTs 56 L, 56 R in the same direction and at the same speed, the lawnmower 12 can travel in a straight path. When the controller 26 drives both of the HSTs 56L, 56R in the same direction but at different speeds, the lawnmower 12 can rotate about its yaw axis Y (FIG. 2) in a clockwise direction or a counterclockwise direction from the perspective of FIG. 2 so that the lawnmower 12 travels along a curved path. The curved path can include an arc of a circle whose radius is inversely proportional to the difference between the driving speeds of the HSTs 56L, 56R. When the controller 26 drives both of the HSTs 56L, 56R at the same speed but drives one of the HSTs 56L, 56R in a forward direction and the other of the HSTs 56L, 56R in a reverse direction, the lawnmower 12 can spin clockwise or counterclockwise about its yaw axis Y to provide a zero-radius-turn. The operator can use the control levers 28, 30 to signal the controller 26 to drive the lawnmower 12 straight in the forward direction or in the reverse direction, or turn while traveling in the forward direction or the reverse direction, or spin clockwise or counterclockwise.

The clockwise rotation of the lawnmower 12 while traveling in the forward direction or the reverse direction can also be referred to as a right turning direction from the perspective of the operator or the lawnmower 12. The counterclockwise rotation of the lawnmower 12 while traveling in the forward direction or the reverse direction can also be referred to as a left turning direction from the perspective of the operator or the lawn mower 12.

Referring to FIGS. 1 and 3 collectively, each of the control levers 28, 30 can be pivotally connected to the main frame 14, directly or indirectly, in any appropriate manner such that each of the control levers 28, 30 can pivot independently about a respective pivot axis PA. Referring to FIG. 3, each of the control levers 28, 30 can pivot about the pivot axis PA and into a neutral position N, a first range R1 and a second range R2. The neutral position N can be separate and spaced away from each of the first range R1 and the second range R2. Each of the first range R1 and the second range R2 can include a plurality of positions for the control levers 28, 30. The control levers 28, 30 can pivot from the neutral position N and into the first range R1 in a direction that is away from the seat 18, and from the neutral position N and into the second range R2 in a direction that is toward the seat 18. The control levers 28, 30 can pivot between positions in the first range R1 and the second range R2 without stopping at the neutral position N.

Referring to FIGS. 2 and 3, the sensors 32, 34 can be in electrical communication with the controller 26. The sensors 32, 34 can be any appropriate sensor that can generate a signal that is indicative of the direction in which the respective handle 28, 30 is pivoted by the operator and the magnitude of the movement of the respective handle 28, 30 by the operator. For example, each of the sensors 32, 34 can be a potentiometer, rotary Hall-effect sensor, encoder, or other angle position sensor.

Referring to FIGS. 1-3 collectively, each of the sensors 32, 34 can be configured to generate a signal and transmit the respective signal to the controller 26. The signals can include data indicative of the position of the respective control lever 28, 30 with respect to a first range R1, a second range R2 and a neutral position N. The controller 26 can be configured to determine a speed and a direction of travel requested by the operator of the lawnmower 12 from the signals. The controller 26 can be configured to process the signal data in accordance with a first process when the controller 26 operates in the first mode and in accordance with a second process when the controller 26 operates in the second mode.

Figure 4:
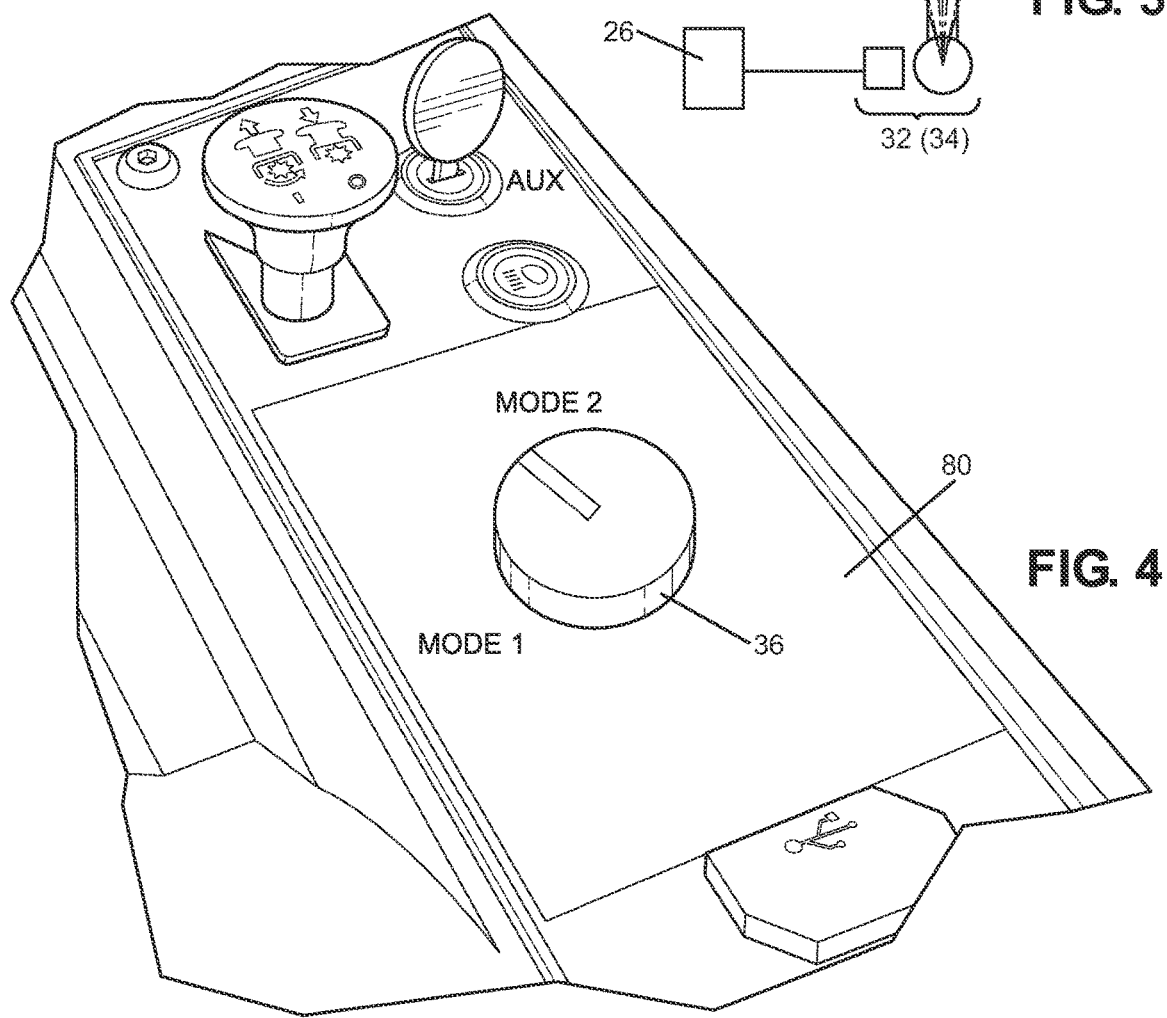
FIG. 4 is a perspective view of a control panel of the lawnmower of FIG. 1.

Referring to FIG. 4, the drive-by-wire system 10 can be selectively operated in the first mode or the second mode based on a selection made by an operator of the lawnmower 12 using the mode selector 36. The mode selector 36 can be mounted at any appropriate location on the lawnmower 12 that is within a suitable reach distance from the operator when the operator is seated in the seat 18. In the exemplary embodiment of FIG. 1, the mode selector 36 can be mounted on a control panel 80 located adjacent to or on the right fender 82 of the lawnmower. The mode selector 36 can be any appropriate type of switch such as but not limited to a rotary dial, a rotary knob, a toggle switch, at least one push button, a magnetic position sensor, at least one touch sensor, or an icon on a touch screen. FIG. 4 illustrates the mode selector 36 as a rotary dial that can be moved between a Mode 1 position and a Mode 2 position.

Returning to FIG. 2, the mode selector 36 can be in electrical communication with the controller 26. The mode selector 36 can be configured to output a first signal when in the Mode 1 position and a second signal that is different from the first signal when in the Mode 2 position. The drive-by-wire system 10 can operate in the first mode when the controller 26 receives the first signal from the mode selector 36 and in the second mode when the controller 26 receives the second signal from the mode selector 36.

Figure 5:
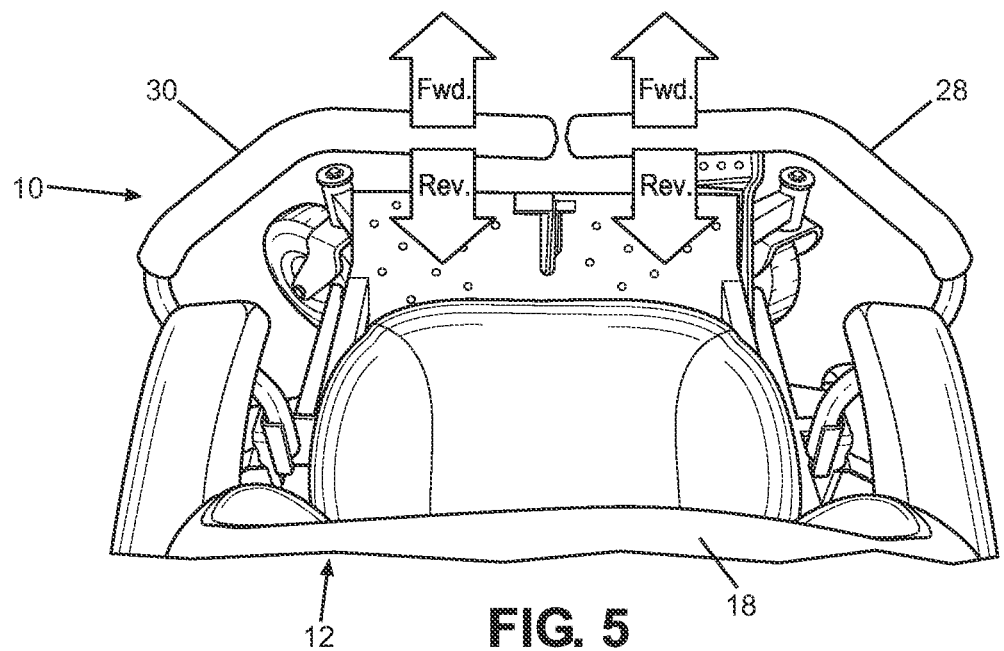
FIG. 5 is a top view of a portion of the lawnmower of FIG. 1 and shows operations of drive-by-wire system in a first mode.

FIG. 5 illustrates operations of the control handles 28, 30 when the drive-by-wire system 10 operates in the first mode. The controller 26 can be configured to operate in the first mode such that the controller 26 controls the right HST 56R based only on the signal received from the right sensor 32 and the left HST 56L based only on the signal received from the left sensor 34. That is, the controller 26 can control the right HST 56R independently from the signals received from the left sensor 34 and the left HST 56L independently from the signals received from the right sensor 32.

Specifically, the first range R1 can correspond to a forward direction of travel of the lawnmower 12 and the second range R2 can correspond to a reverse direction of travel of the lawnmower 12. The controller 26 can be configured to drive the right HST 56R in the forward direction when the right control lever 28 is in the first range R1 and in reverse direction when the right control lever 28 is in the second range R2. The controller 26 can be configured to drive the left HST 56L in the forward direction when the left control lever 30 is in the first range R1 and in reverse direction when the left control lever 30 is in the second range R2. If the operator moves the control levers 28, 30 into different relative positions in the first range R1, the controller 26 can drive both of the HSTs 56L, 56R in the forward direction but at different speeds, where the speed of each of the HSTs 56L, 56R corresponds to the position of the respective one of the control levers 28, 30 in the first range R1. If the operator moves the control levers 28, 30 into different relative positions in the second range R2, the controller 26 can drive both of the HSTs 56L, 56R in the reverse direction but at different speeds, where the speed of each of the HSTs 56L, 56R corresponds to the position of the respective one of the control levers 28, 30 in the second range R2.

The controller 26 can be configured to determine a neutral condition and cause the HSTs 56L, 56R to idle when a respective one of the control levers 28, 30 is in the neutral position N. The lawnmower 12 can come to a stop when both of the HSTs 56L, 56R are caused to idle.

The controller 26 can be configured to drive one of the HSTs 56L, 56R in the forward direction and the other of the HSTs 56L, 56R in the reverse direction when the respective one of the control levers 28, 30 is in the first range R1 and the other of the control levers 28, 30 is in the second range R2. If both control levers 28, 30 are placed at the same position while in opposite ranges R1, R2, the controller 26 can drive the HTSs 56L, 56R to spin the lawnmower 12 about its yaw axis Y. However, any variation the positions of the control levers 28, 30 can cause the lawnmower 12 to deviate from a zero-turn-radius. Thus, it can be difficult for an operator to maintain a precise zero-turn-radius in the first mode of the drive-by-wire system 10.

Accordingly, the first mode can emulate the operation of mechanically linked control levers of a conventional ZTR lawnmower. Further, the first mode of the drive-by-wire system 10 can mimic some or all of the deficiencies described above with respect to a conventional ZTR lawnmower.

Figure 6:
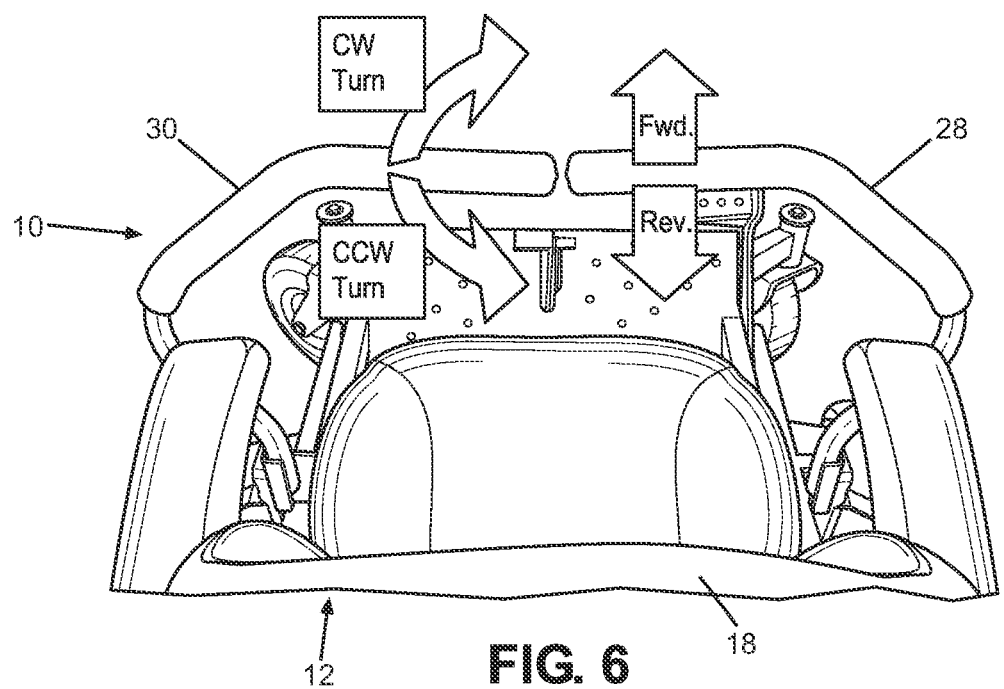
FIG. 6 is a top view of a portion of the lawnmower of FIG. 1 and shows operations of the drive-by-wire system in a second mode.

FIG. 6 illustrates operations of the control handles 28, 30 when the drive-by-wire system 10 operates in the second mode. The drive-by-wire system 10 can be configured to operate in the second mode such that the right control lever 28 controls the travel speed and the forward direction travel and reverse direction travel of the lawnmower 12 and the left control lever 30 controls the steering direction of the lawnmower 12. Further, the second mode of the drive-by-wire system 10 can provide precise or nearly precise zero-turn-radius operation using one of the control levers 28, 30. That is, the drive-by-wire system 10 can be configured to select one drive condition from a plurality of drive conditions that include a straight condition, a normal turn condition, and a zero-turn-radius condition. Thus, the second mode can relieve the operator of precise control of both of the control levers 28, 30 when the operator desires a precise or nearly precise straight line tracking or a zero-turn-radius operation.

Specifically, in the second mode, the controller 26 can select the straight condition in which the controller 26 is configured to drive both HSTs 56L, 56R in the forward direction and at the same speed when the right control lever 28 is in the first range R1 and the left control lever 30 is in the neutral position N. Further, the controller 26 can be configured to drive both HSTs 56L, 56R in the reverse direction and at the same speed when the right control lever 28 is in second range R2 and the left control lever 30 is in the neutral position N. The controller 26 can be configured to set the same speed for both HSTs 56L, 56R based on the position of the right control lever 28 in the first range R1 or the second range R2. That is, the operator can use a single one of the control levers 28, 30 to control both HSTs 56L, 56R simultaneously. Thus, the drive-by-wire system 10 can provide a straight line tracking function using only the right control lever 28. This feature can allow an operator to more precisely control the speed of the lawnmower 12 without deviating from the straight line path of the lawnmower 12.

Further, in the second mode, the controller 26 can select the normal turn condition in which the controller 26 drives both of the HSTs 56L, 58R in the same direction but at different speeds, thereby allowing the operator to steer the lawnmower 12 along the desired curved path. When traversing a curved path, one of the wheels 20L, 20R follows an inner curve (or circle) and the other of the wheels 20L, 20R follows an outer curve (or circle). The one of the wheels 20L, 20R that follows the inner curve can be referred to as an inside wheel and the corresponding one of the HSTs 56L, 56R can be referred to as the inside motor. The one of the wheels 20L, 20R that follows the outer curve can be referred to as an outside wheel and the corresponding one of the HSTs 56L, 56R can be referred to as the outside motor. The controller 26 can be configured to determine the right HST 56R is the inside motor and the left HST 56L is the outside motor when the left lever 30 is in the first range R1. The controller 26 can be configured to determine the right HST 56R is the outside motor and the left HST 56L is the inside motor when the left lever 30 is in the second range R2.

The controller 26 can be configured to determine an outside wheel speed that directly correlates to the position of the right control lever 28 and a speed reduction amount that directly correlates to the position of the left control lever 30. That is, the operator can set the speed of the turn with the right control lever 28 and the direction of the turn with the left control lever 30. The controller 26 can be configured to determine an inside wheel speed by subtracting the speed reduction amount from the outside wheel speed.

For example, each of the ranges R1, R2 for the left control lever 30 can include a normal turn range that extends from the respective one of the minimum speed locations R1min, R2min to a respective one of a first zero-turn location R1z and a second zero-turn location R2z shown in FIG. 3. The zero-turn locations R1z, R2z can be spaced away from the respective one of the maximum speed locations R1max, R2max by a predetermined angle that can provide a desired zero-turn-radius operation of the lawnmower 12. The outside wheel speed can increase as the right control lever 28 moves from the first minimum speed position R1min or the second minimum speed position R2min to the first zero-turn location R1z or the second zero-turn location R2z, respectively. The speed reduction amount can increase as the left control lever 30 moves from the first minimum speed position R1min or the second minimum speed position R2min to the first zero-turn location R1z or the second zero-turn location R2z, respectively. That is, the radius of the curved path of the lawnmower 12 can decrease as the speed reduction amount increases.

The controller 26 can be configured to, in this second mode, execute a zero-radius turn when left lever 30 is placed in a location that is between and inclusive of the first zero turn location R1z and the first maximum speed location R1max (FIG. 3) for a clockwise zero-radius turn or in a location that is between and inclusive of second zero turn location R2z and the second maximum speed location R2max (FIG. 3) for a counterclockwise zero-radius turn. The controller 26 can be configured to drive both of the HSTs 56L, 56R at the same speed but drive the right HST 56R in the reverse direction and the left HST 56L in the forward direction when the left control lever 30 is in any position from the first zero turn location R1z to the first maximum speed location R1max and the right control lever 28 is in any location in either the first range R1 or the second range R2. This can result in a clockwise zero-turn-radius spin of the lawnmower 12 in the frame of reference of FIG. 6. Further, the controller 26 can be similarly configured to cause the lawnmower 12 execute a counterclockwise zero-turn-radius spin when the left control lever 30 any position from the second zero turn location R2zto the second maximum speed location R2max and the right control lever 28 is in any location in either the first range R1 or the second range R2. Thus, the second mode of the drive-by-wire system 10 can provide precise or nearly precise zero-turn-radius operation of the lawnmower 12 using only the left control lever 30.

The controller 26 can be configured to terminate the zero-radius-turn operation of the lawnmower 12 if the operator moves left control lever 30 out of the range of positions between the first zero turn location R1z and the first maximum speed location R1max or between the second zero turn location R2z and the second maximum speed location R2max. This permits the operator to stop the zero-radius-turn and resume a straight path operation or normal turn operation by manipulating only one of the two control levers 28, 30, which operation can be the same as or similar to operation of a conventional zero-turn-radius lawnmower.

Further, the controller 26 can be configured to cause both HSTs 56L, 56R to idle when the right control lever 28 is in the neutral position. This can permit the operator to bring the lawnmower to a stop by manipulating only one of the two control levers 28, 30, as compared to operating both levers of a conventional lawnmower in order to stop the conventional lawnmower.

Figure 8:
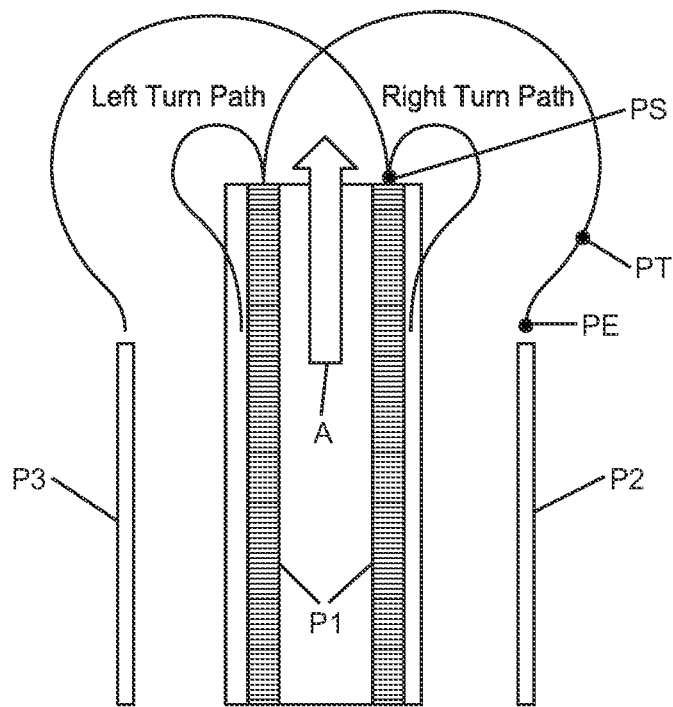
FIG. 8 is an overhead view of a travel path of the lawnmower of FIG. 1 when the operator inputs of FIG. 7 are used in the second mode.

The first mode and the second mode of the drive-by-wire system 10 can include an automated turn function that can allow the operator to instruct the controller 26 to drive the HSTs 56L, 56R so that the lawnmower 12 performs a predetermined change of direction. For example, in response to an operator input when the lawnmower 12 is traveling along a path P1 in a first direction indicated by arrow A in FIG. 8, the controller 26 can drive the HSTs 56L, 56R so that the lawnmower 12 follows either a right turn path or a left turn path and travels along a new path P2, or new path P3, that is adjacent to the previous path P1 and in a direction that is opposite to the direction indicated by arrow A.

Figure 7:
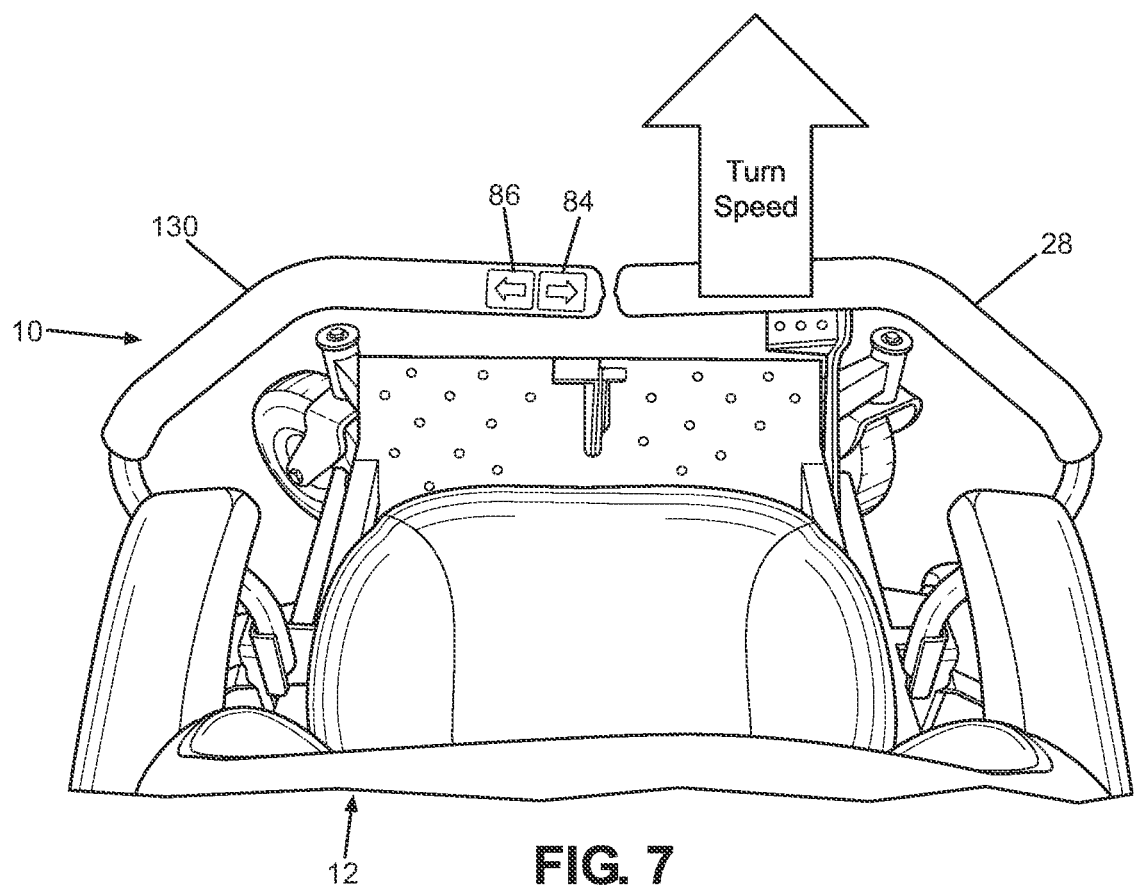
FIG. 7 is a top view of a portion of the lawnmower of FIG. 1 and shows a second embodiment of operator inputs and further operations of the drive-by-wire system in the second mode.

Referring to FIG. 7, the drive by wire system 10 can include an alternate embodiment of a left control lever 130 that includes a right auto-turn switch 84 and a left auto-turn switch 86. The left control lever 130 can include all of the features and perform all of the operations described above with respect to the left control lever 30. The switches 84, 86 can be in electrical communication with the controller 26 and can be configured to transmit a respective turn direction signal to the controller 26 in response to an input by the operator of the lawnmower 12. Each of the switches 84, 86 can be any appropriate switch such as but not limited to a push button, a touch sensor, or an icon on a touch screen. The switches 84, 86 can be located at any appropriate position on the left control lever 130 that can permit easy access by the operator and convenient use of the left control handle 130 without inadvertent actuation of either of the switches 84, 86.

The controller 26 can be configured to, in the first mode and the second mode, determine the speed of each of the HSTs 56L, 56R based on the position of the right control lever 28 in the first range R1 and whether the controller 26 receives a turn direction signal from the right auto-turn switch 84 or the left auto-turn switch 86. The controller 26 can be configured to determine the right HST 56R is the inside motor and the left HST 56L is the outside motor when the controller 26 receives a turn direction signal from the right auto-turn switch 84 and determine the left HST 56L is the inside motor and the right wheel 20R is the outside motor when the controller 26 receives a turn direction signal from the left auto-turn switch 86. The controller 26 can be configured to determine an outside drive speed that directly corresponds to the speed signal from the right sensor 32 and drive the outside motor at the outside drive speed. The controller 26 can be configured to determine an inside drive speed that is less than the outside drive speed and drive the inside motor at the inside drive speed until the lawnmower 12 travels a predetermined arcuate path.

Figure 9:
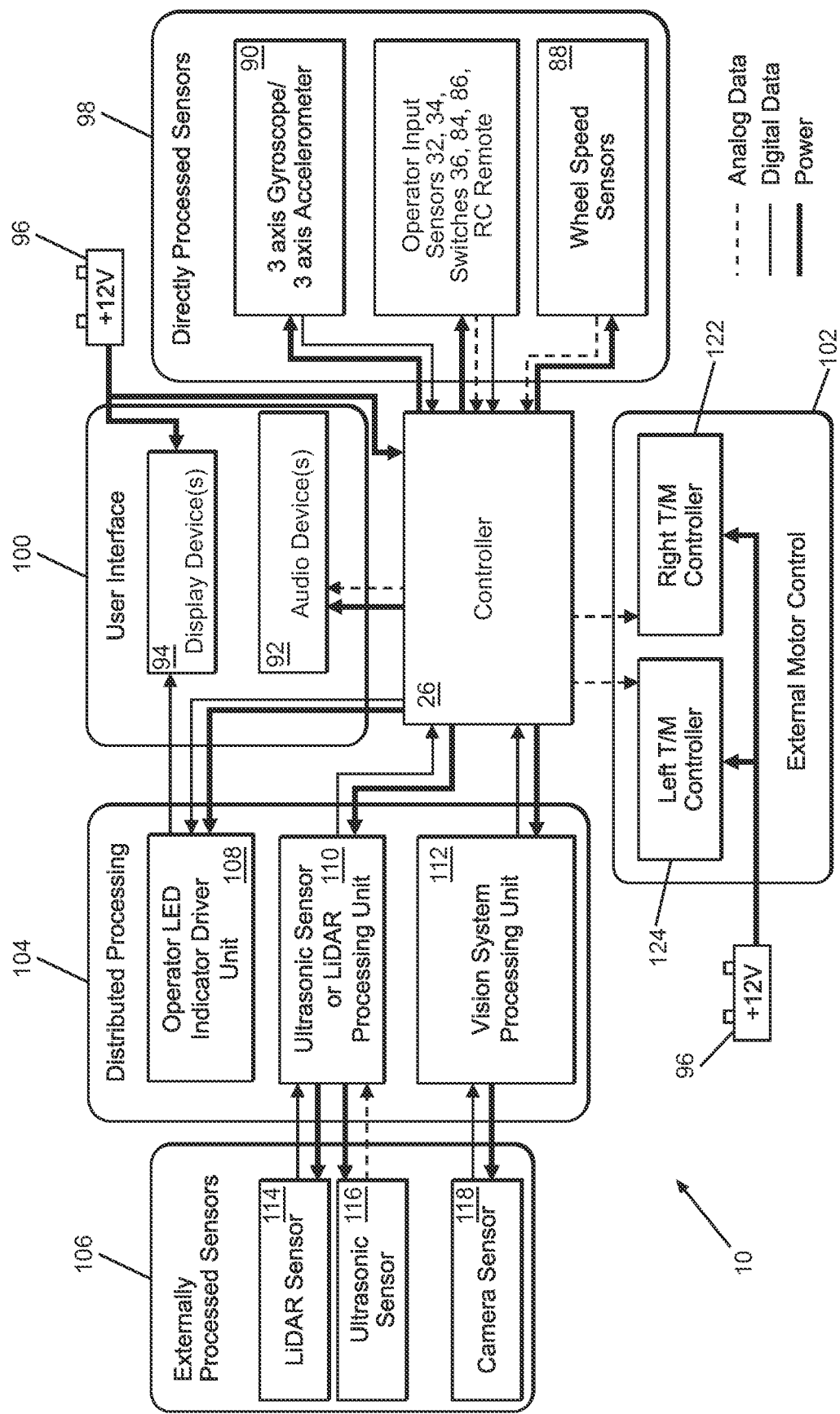
FIG. 9 is a schematic view showing the electrical power distribution and electrical signal communication for the drive-by-wire system of the lawnmower of FIG. 1.

Referring to FIG. 9, the lawnmower 12 can include a respective wheel speed sensor 88 and a dynamic sensor array 90 that are in electrical communication with the controller 26. The dynamic sensor array 90 can include a three-axis gyroscope and a three-axis accelerometer. The controller 26 can be configured to determine a current arcuate distance travelled by the lawnmower 12 while the controller is driving the HSTs 56L, 56R according to the automated turn operation of the lawnmower 12. The controller 26 can be configured to use data from the wheel speed sensors 88 to determine the current arcuate distance travelled by the lawnmower 12 or the data from the three-axis gyroscope and/or the three-axis accelerometer to determine an angular displacement of the lawnmower 12. The controller 26 can be configured to compare the current arcuate distance to a predetermined distance threshold (or the current angular displacement to a predetermined angular threshold). The controller 26 can be configured to continue a first phase of the auto-turn operation of the lawn mower 12 until the current arcuate distance or angular displacement is equal to the predetermined distance threshold or the predetermined angular threshold, respectively.

The predetermined threshold can correspond to the arcuate travel distance from a start point PS on the current path P1 to a transition point PT on the left/right turn path. The path from the start point PS to the transition point PT can be referred to as phase 1 and the path from the transition point PT to the end point PE can be referred to as phase 2. The current arcuate distance or the current angular displacement can be referred to as a current orientation of the lawnmower 12. The current orientation can be an orientation of the lawnmower 12 relative to the previous path P1.

When the current orientation is equal to the predetermined threshold, the lawnmower 12 has completed travel along phase 1. The controller 26 can be configured to steer the lawnmower 12 along phase 2 by driving the outside motor at a predetermined inside transition speed and the inside motor at a predetermined outside transition speed so the lawnmower 12 can change the arcuate path and transition from the transition point PT to the end point PE where the lawnmower 12 can begin traveling along the new path P2, or the new path P3. The controller 26 can be configured to compare the orientation of the lawnmower along phase 2 to a second predetermined threshold. The controller 26 can be configured to maintain this transitional operation until the transitional arcuate distance is equal to a second predetermined threshold. Once the controller 26 determines that the lawnmower 12 has reached the end point PE, the controller 26 can resume the second mode control of the HSTs 56L, 56R according to the drive signals and/or neutral signals received from the sensors 32, 34 as described above with respect to FIG. 6.

The controller 26 can be configured to abort the automated turn operation prior to its completion if the operator moves either the right control lever 28 or the left control lever 30 into a predetermined position. For example, the controller 26 can be configured to abort the automated turn operation if the controller 26 receives a signal from the right sensor 32 that indicates the right control lever 28 has been moved into the neutral position N. Additionally, or alternatively, the controller 26 can be configured to abort the automated turn operation if the controller 26 receives a signal from the left sensor 34 that indicates that the left control lever 28 has been moved into the neutral position N.

FIG. 9 is a schematic view showing the electrical power distribution and electrical signal communication for the drive-by-wire system 10. The drive-by-wire system 10 can include at least one battery 96, a directly processed sensor array 98, a user interface 100, an external motor control system 102, a distributed processing system 104 and an externally processed sensor array 106.

The external motor control system 112 can include a right HST controller 122 and a left HST controller 124. Instead of the controller 26 being directly connected to the actuator 70 as shown in FIG. 2, the controller 26 can send drive commands to the right HST controller 122 and to the left HST controller 124 that are based on the signals received from the sensors 32, 34. The controllers 122, 124 can be configured to signal the respective actuator 70 as described above with respect to FIGS. 5-8.

Although FIG. 9 appears to show two batteries 96, the battery 96 of FIG. 9 can be a single battery 96 with the second location of the battery 96 illustrated to simplify the electric power distribution paths between the battery 96 and each of the electric/electrical devices of the drive-by-wire system 10. However, alternate embodiments can include a second battery 96 that is dedicated to the external motor control system 102.

The controller 26 can be in electrical power communication with the battery 96. The controller 26 can distribute power from the battery 96 to each of the directly processed sensor array 98, at least one audio device 92 of the user interface 100, the distributed processing system 104 and the externally process sensor array 106. The battery 96 can supply power directly to the external motor control system 102 and at least one display device 94 of the user interface 100.

The controller 26 can be in electrical signal communication directly with each of the directly processed sensor array 98, the audio device(s) 92, external motor control system 102 and the distributed processing system 104. The controller 26 can be in electrical communication indirectly with the display device(s) 94 and the externally process sensor array 106 by way of the distributed processing system 104. The electrical communication to and from the controller 26 can use analog signals or digital signals or a combination of analog signals and digital signals.

The directly processed sensor array 98 can include the sensors 32, 34, the mode selector 36, the auto-turn switches 84, 86, the wheel speed sensors 88 and the dynamic sensor array 90. The wheel speed sensors 88 can send analog communication signal(s) to the controller 26 that are indicative of the rational speed of the respective one of the drive wheels 20L, 20R. The dynamic sensor array 90 can send digital communication signal(s) to the controller 26 that are indicative of the dynamic acceleration(s) acting on the lawnmower 12 and the rotation rate(s) that the lawnmower 12 is experiencing. The sensors 32, 34 can send analog communication signals as described above and the mode selector 36 and the switches 84, 86 can send digital communication signals as described above, and the RC remote can send analog and/or digital communication signals as appropriate to achieve the desired performance of the lawnmower 12. The controller 26 can be configured to distribute electrical power from the battery to the sensors 32, 34, the mode selector 36, the switches 84, 86, the wheel speed sensors 88 and the sensor array 90.

The drive-by-wire system 10 can be configured to operate the lawnmower 12 at a remote distance from the lawnmower 12 that is within a predetermined range. The directly processed sensor array 98 can include a remote control unit (also referred to as an RC unit or as an RC remote) that is configured to mimic the signals of the sensors 32, 34, the mode selector 36 and the auto-turn switches 84, 86 so that the operator to control the lawnmower 12 from the remote distance. The remote control unit can be a feature of the directly processed sensor array.

The drive-by-wire system 10 can be configured to provide audible and/or visual information or messages to the operator of the lawnmower 12. The user interface 100 can include at least one audio device 92 and at least one display device 94 that can alert the operator of at least one predetermined operating condition of the lawnmower 12. The audio device 92 can include, but is not limited to, a speaker, a horn, and/or an alarm buzzer. The display device 94 can include, but is not limited to, at least one LED, a liquid crystal display screen, and/or a touch screen. The controller 26 can be configured to cause the audio device(s) 92 to emit at least one audio message(s) and the display device(s) 94 to display at least one visual message when the controller 26 is in the first mode or in the second mode. The controller 26 can be configured to transmit an analog communication signal directly to the audio device(s) 92.

Figure 10:
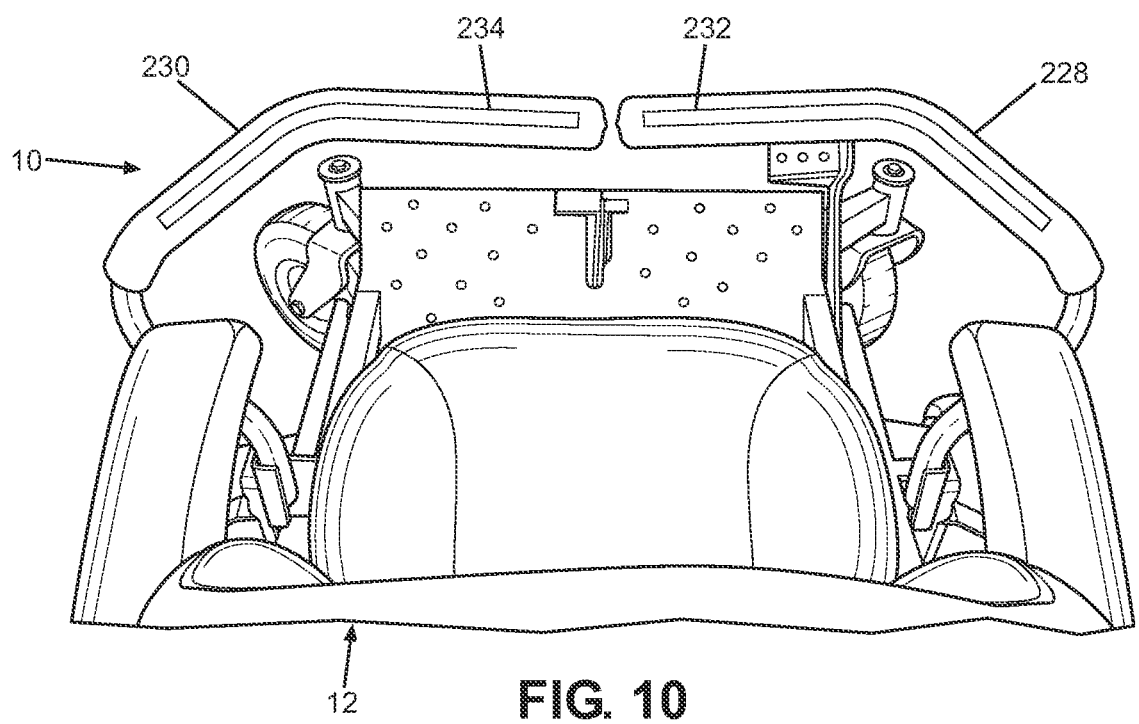
FIG. 10 is a top view of a portion of the lawnmower of FIG. 1 and shows a third embodiment of a pair of operator inputs and further operations of the drive-by-wire system.

Referring to FIG. 10, the drive-by-wire system 10 can include an alternate embodiment of a right control lever 228 and a left control lever 230 that can incorporate a respective display device 94 of the drive-by-wire system 10. The control levers 228, 230 of FIG. 9 can include all of the features and perform all of the operations described above with respect to the control levers 28, 30 of FIGS. 1-6 or the control levers 28, 130 of FIG. 7. Additionally, the control levers 228, 230 of FIG. 9 can include a respective display device 94 that is configured as a light strip 232, 234. Each of the light strips 232, 234 can include a plurality of color light emitting diodes ("LEDs") distributed along the length of the light strips 232, 234.

The distributed processing system 104 can include an operator LED indicator driver unit 108. The controller 26 can be in electrical communication with the driver unit 108 such that the controller 26 can selectively supply power from the battery 96 to the driver unit 108 and send a display command signal to the driver unit 108. The controller 26 can be configured to determine the display command for one or both of the light strips 232, 234 based on data the controller 26 receives from the directly processed sensor array 98. The controller 26 can be configured to send the display command signal as a digital communication signal to the driver unit 108.

The operator LED indicator driver unit 108 can be configured to process the display command signal received from the controller 26 and issue an appropriate one of an illumination signal and off signal to one or both of the light strips 232, 234. The illumination signal can be a digital communication signal. The controller 26 can be configured to send one a plurality of different display command signals and the unit 108 can be configured to send one of a plurality of different illumination signals that correspond to the plurality of different display command signals, respectively.

FIGS. 11-14 illustrate a respective one of a plurality of visual messages that the drive-by-wire system 10 can present to the operator during operation of the lawnmower 12.

Figure 11:
FIGS. 11-14 show respective illuminated messages displayed by the drive-by wire system.
Figure 12:

FIG. 11 shows a clockwise (right) turn message in which the right light bar 232 is illuminated and the left light bar 234 is turned off. FIG. 12 shows a counterclockwise (left) turn message in which the left light bar 234 is illuminated and the right light bar 232 is turned off. An alternate embodiment can illuminate both light bars 232, 234 when the lawnmower 12 is turning clockwise or counterclockwise. The controller 26 can be configured determine the turning direction based on the signals received from the sensors 32, 34 and send to the operator LED indicator driver unit 108 the display command that corresponds to the determined turning direction. The driver unit 108 can be configured to signal the light strips 232, 234 to illuminate the LEDs in a predetermined manner that can be readily recognized by the operator as an indication of the turning direction of the lawnmower 12. For example, the driver unit 108 can be configured to signal the right light strip 232 alone, /or in combination with the left light strip 234 to illuminate in a predetermined color, such as but not limited to blue, and in a predetermined pattern, such as but not limited to an increased intensity blue portion that scrolls across the right light strip 234 alone, or across both of the light strips 232, 234 from left to right over a lesser intensity blue background.

If both light strips 232, 234 are illuminated, the controller 26 can be configured to signal the light strips 232, 234 such that the pattern starts and ends on one of the light strips 232, 234 before the pattern starts on the other of the light strips 232, 234. Alternate embodiments can include the controller 26 configured to signal the light strips 232, 234 to scroll a respective pattern in a synchronized manner.

Figure 13:
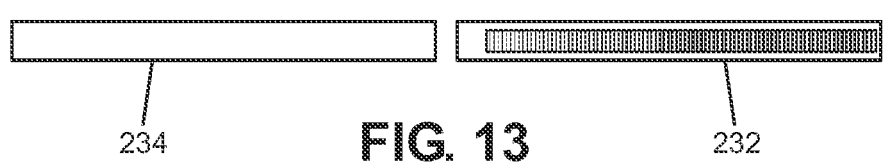
Figure 15:
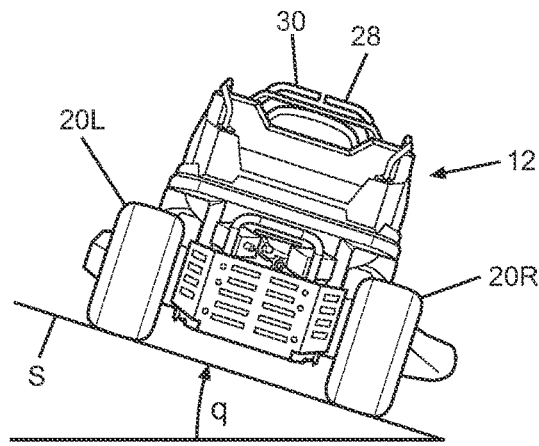
FIG. 15 is a rear view of the lawnmower of FIG. 1 while being driven on inclined surface.

FIG. 13 illustrates an exemplary tilt warning message that can be indicative of the lawnmowers 12 tilt attitude. Referring to FIG. 15, the lawnmower 12 can be operated on uneven terrain, including along an inclined surface S that is inclined at a tilt angle θ with respect to horizontal. The controller 26 can be configured to determine the tilt angle θ from data received from the dynamic sensor array 90 and compare the tilt angle θ with a predetermined first warning threshold and a predetermined second warning threshold that is greater than the first warning threshold. The controller 26 can be configured to send an audio command to the audio device(s) 92 and a display command to the operator LED indicator driver unit 108 when the tilt angle θ is greater than the first warning threshold and less than the second warning threshold.

The audio command can cause the audio device(s) 92 to emit a sound pulse at increased frequencies as the difference between the tilt angle θ and the second warning threshold decreases and decreasing frequencies as the difference between the tilt angle θ and the second warning threshold increases. The controller 26 can be configured to signal the audio device(s) 92 to emit a continuous sound when the tilt angle θ is equal to or greater than the second warning threshold.

The display command can indicate which side of the lawnmower 12 is the high side and the difference between the tilt angle θ and the second warning threshold. The operator LED indicator driver unit 108 can be configured to signal the appropriate one of the light strips 232, 234 to illuminate the LEDs in a predetermined manner that can be readily recognized by the operator as an indication of high side of the lawnmower 12. For example, the driver unit 108 can be configured to signal the right light strip 232 or strip 234 to illuminate in a predetermined color, such as but not limited to red, and in a predetermined pattern, such as but not limited to a flashing pattern. The flashing pattern can increase in frequency as the difference between the tilt angle θ and the second warning threshold decreases and decrease in frequency as the difference between the tilt angle θ and the second warning threshold increases.

Returning to FIG. 9, the drive-by-wire system 10 can include an obstacle detection and avoidance system. The obstacle detection and avoidance system can operate in the first mode and in the second mode of the drive-by-wire system 10 described above with respect to FIGS. 5-8. The obstacle detection and avoidance system can include the controller 26, the externally processed sensor array 106 and the distributed processing system 104.

The distributed processing system 104 can include an ultrasonic/LiDAR processing unit 110 and a vision system processing unit 112, and the externally processed sensor array 106 can include a LiDAR sensor 114, an ultrasonic sensor 116 and a camera sensor 118. The controller 26 can be configured to limit the travel speed of the lawnmower 12, signal the HSTs 56L, 56R to reduce the travel speed of the lawnmower 12, or signal the HSTs 56L, 56R to stop the travel of the lawnmower 10 based on signals the controller 26 receives from the ultrasonic/LiDAR processing unit 110 and the vision system processing unit 112. Optionally, the controller 26 can be configured to send an audio command to the audio device(s) 92 and a display command to the operator LED indicator driver unit 108 based on the signals the controller 26 receives from the ultrasonic/LiDAR processing unit 110 and the vision system processing unit 112 to cause the audios device(s) 92 to emit a predetermined audio message and one or both of the light strips 232, 234 to illuminate with a predetermined color and a predetermined pattern such as that shown in FIG. 14.

The controller 26 can be in electrical communication with the ultrasonic/LiDAR processing unit 110 and the vision system processing unit 112 such that the controller 26 can selectively supply power from the battery 96 to the units 110, 112 and receive a first object location signal and a second object location signal from the units 110, 112, respectively.

Figure 16:
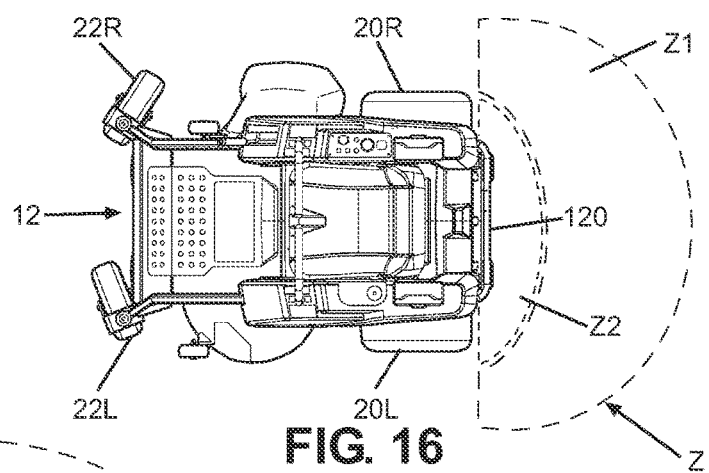
FIG. 16 is an overhead view of the lawnmower of FIG. 1 and shows a default obstacle detection zone.

The sensors 114, 116, 118 can be mounted at different locations on the rear end 120 of the lawnmower 12. Referring to FIG. 16, the LiDAR sensor 114 and/or the ultrasonic sensor 116 can be configured to scan a predetermined scan two-dimensional plane that extends outwardly from the rear end 120 of the lawnmower 12 and is spaced above ground level by a predetermined distance. The scan plane can include at least predetermined detection zone Z that radiates out from the rear end 120 of the lawnmower 12. The LiDAR sensor 114 and the ultrasonic sensor 116 can be configured to send a first data signal and a second data signal, respectively, that can include information that is indicative of the physical location of one or more objects located in the field of view of the sensors 114, 116. For example, the first data signal from the LiDAR sensor 114 can include data in a polar format (angle and radius). The first data signal and the second data signal can be configured as a point array or a data array.

The LiDAR sensor 114 and the ultrasonic sensor 116 can be in electrical communication with the ultrasonic/LiDAR processing unit 110 such that the ultrasonic/LiDAR processing unit 110 can selectively supply power from the controller 26 to the LiDAR sensor 114 and ultrasonic sensor 116, the LiDAR sensor 114 can send the first image signal to the ultrasonic/LiDAR processing unit 110, and the ultrasonic sensor 116 can send the second image signal to the ultrasonic/LiDAR processing unit 110. The first image signal can be a digital communication signal and the second image signal can be analog communication signal.

The ultrasonic/LiDAR processing unit 110 can be configured to determine a first detection command based on the first image signal and send the first detection signal to the controller 26. The vision system processing unit 112 can be configured to determine a second detection signal based on the second image signal and send the second detection signal to the controller 26. The first and second detection signals can be digital communication signals. The first detection signal and the second detection signal can include data that is indicative of the location of any object(s) detected in the field of view of the sensors 114, 116.

The controller 26 can be configured to determine a reverse travel state of the lawnmower 12 when the first and second direction signals indicate that at least the left control lever is in the second range R2. The controller 26 can be configured to supply power to the ultrasonic sensor/LiDAR processing unit 110 and the vision system processing unit 112 when the controller determines the reverse travel state and terminate the supply of power to the units 110, 112 when the controller determines that the lawnmower 12 is not in the reverse travel state.

The controller 26 can be configured to divide the detection zone Z into a predetermined warning zone Z1 and predetermined stop zone Z2. The controller 26 can be configured to determine whether the location data included with the first detection signal or the second detection signal lies within the warning zone Z1 or the stop zone Z2. If the controller 26 determines that the first detection signal or the second detection signal includes location data that lies within the warning zone Z1, the controller 26 can be configured to reduce a maximum speed limit for the HSTs 56L, 56R and/or send a drive signal to the HSTs 56L, 56R that causes the HSTs 56L, 56R to reduce their drive speed. If the controller determines that the first detection signal or the second detection signal includes location data that lies within the stop zone Z2, the controller 26 can be configured to ignore any movement of the control levers 28, 32 in the second region R2 by the operator and signal the HSTs 56L, 56R to stop the lawnmower 12.

Figure 17:
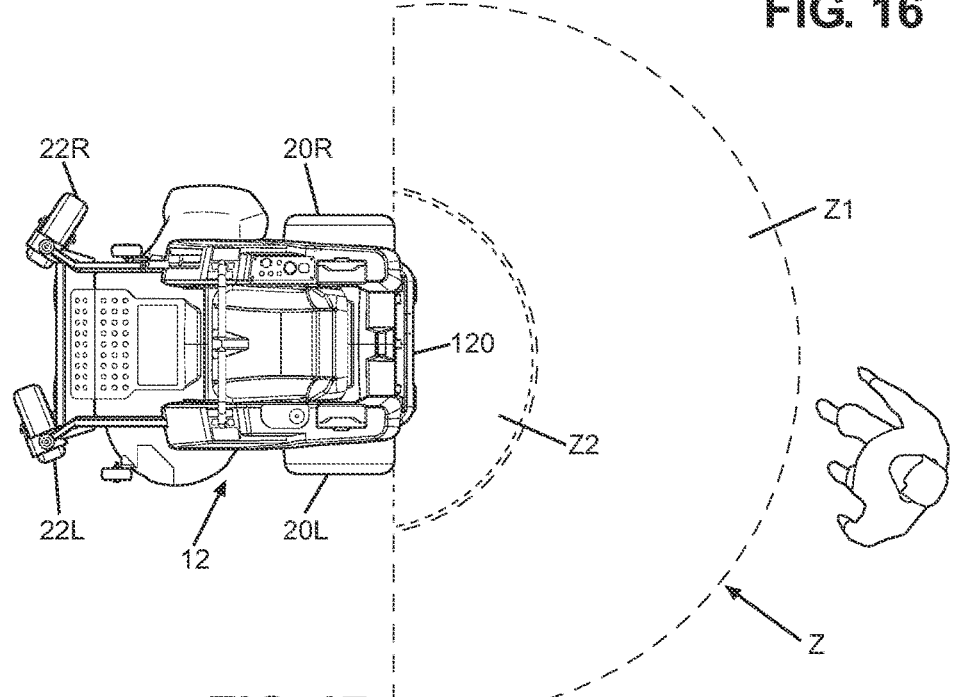
FIG. 17 an overhead view of the lawnmower of FIG. 1 and an enlarged obstacle detection zone.

Although FIGS. 16 and 17 show the zones Z, Z1, Z2 as having a semicircular shape, exemplary embodiments can include zones Z, Z1, Z2 that have a rectangular shape, r square shape, or other shape, where the warning zone Z1 and the stop zone Z2 have a width that corresponds to the width of the lawnmower 12 measured at the drive wheels 20L, 20R. The square or rectangular shape for the zones Z, Z1, Z2 can be advantageous when the lawnmower 12 travels in a reverse direction next to a building or house. The the lateral edges of the zones Z, Z1, Z2 can extend parallel or substantially parallel to the exterior of the building or house. Thus, the exterior of the building or house can be outside of the zones Z, Z1, Z2 and a false obstacle detection caused by the building or house can be avoided.

The directly processed sensor array 98 of the drive-by-wire system 10 can include an operator input that can allow the operator of the lawnmower to adjust the boundary of the zones Z1, Z2. For example, the operator input can permit the operator of the lawnmower 12 to toggle between the semicircular shape of the zones Z1, Z2 sons in FIGS. 16 and 17 and the rectangular shape of the zones Z1, Z2 described above. As another example, the operator input can permit the operator of the lawnmower 12 to change the radius and arclength (or width and/or the length) of the zones Z1, Z2.

Comparing FIGS. 16 and 17, the controller 26 can be configured to adjust the size of the warning zone Z1 and the stop zone Z2 based on the second detection signal received from the vision system processing unit 112. The zones Z1, Z2 of FIG. 17 are bigger than the zones Z1, Z2 of FIG. 16. The second detection signal can include information that is indicative of the presence of predetermined object such as but not limited to a human. The controller 26 can be configured to compare the location data to the larger zones Z1, Z2 shown FIG. 17 when the second detection signal includes information that is indicative of the presence of the predetermined object. The controller 26 can be configured to compare the location data to the smaller warning zone Z1 and the stop zone Z2 shown in FIG. 16 when the second detection signal does not include information that is indicative of the presence of the predetermined object.

Figure 14:

Optionally, the controller 26 can send an audio command to the audio device(s) 92 and/or a display command to the operator LED indicator driver unit 108 when the controller 26 determines that the first detection signal or the second detection signal includes location data that lies within the warning zone Z1. Referring to FIG. 14, the operator LED indicator driver unit 108 can be configured to signal at least one of the light strips 232, 234 to illuminate the LEDs in a predetermined manner that can be readily recognized by the operator as an indication of relative location of a detected object. For example, the operator LED indicator driver unit 108 can be configured to signal the right light strip 232 or strip 234 to illuminate in a predetermined color, such as but not limited to yellow, and in a predetermined pattern, such as but not limited to a yellow portion whose size increase as the lawnmower 12 approaches the detected object.

In an alternate embodiment, the drive by-wire system 10 can include a drive speed selector 140. FIG. 1 schematically represents the drive speed selector 140 mounted on the left control lever 30. However, exemplary embodiments can include the drive speed selector 140 mounted on the right control lever 28. The drive speed selector 140 can be a component of the directly processed sensor array 98 of FIG. 9 and n electrical communication with the controller 26. The drive speed selector 140 can be configured to output a signal indicative of a maximum drive speed. The drive speed selector 140 can be configured to permit an operator of the lawnmower 12 to select a maximum drive speed from a plurality of different maximum drive speeds. The drive speed selector can be any appropriate interface such as, but not limited to, a rotary know, a sliding knob, a touch screen, an icon on a touch screen, or a toggle switch with and "up" arrow at one end and "down" arrow at the other end.

When the operator of the lawnmower 12 selects a maximum drive speed with the drive speed selector 140 and the drive-by-wire system is operating in the first mode, the controller 26 can be configured to determine a first requested drive speed from the signal from the first right sensor 32 and a second requested drive speed from signal form the left sensor 34 and compare the maximum drive speed to each of the first requested drive speed signal and the second requested drive speed signal. The controller 26 can be configured to cause the right HST 56R to operate at the first requested drive speed when the first requested drive speed is less than the maximum drive speed, and cause the left HST 56L to operate at the second requested drive speed when the second requested drive speed is less than the maximum drive speed. The controller can be configured to cause the right HST 56R to operate at the maximum drive speed when the first requested drive speed is equal to or greater than the maximum drive speed, and cause the left HST 56L to operate at the maximum drive speed when the second requested drive speed is equal to or greater than the maximum drive speed.

When the operator of the lawnmower 12 selects a maximum drive speed with the drive speed selector 140 and the drive-by-wire system is operating in the second mode, the controller can be configured to determine a requested drive speed from the signal from the right sensor 32, and compare the maximum drive speed to requested drive speed signal. The controller 26 can be configured to cause each of the HSTs 56L, 56R to operate at the requested drive speed when the requested drive speed is less than the maximum drive speed, and cause each of the HSTs 56L, 56R to operate at the maximum drive speed when the requested drive speed is equal to or greater than the maximum drive speed.

Thus, the operator can simply place the lever(s) 28, 30 in the R1$max$ or R2$max$ position to maintain a desired fixed speed.

Accordingly, the drive-by-wire system 10 can permit an operator of the lawnmower 12 to operate the control levers 28, 30 in either a first mode, which can mimic a traditional operation of the control levers 28, 30, or a second mode, which can simplify the input demand(s) on the operator and provide an increased precision in the directional control of the lawnmower 12 as compared to the first mode. Further, the drive-by-wire system 10 can enhance the operator's awareness of the operational status of the lawnmower 12. Further still, the drive-by-wire system 10 can provide one or more automated operations of the lawnmower 12 that can improve the performance of the lawnmower 12 in the second mode as compared to the first mode and provide obstacle detection and avoidance in both the first mode and the second mode.

The wheel speed sensors 88 can be mounted on an appropriate portion of the lawnmower 12 to detect rotation of the respective drive wheel 20L, 20R. The raw data from the wheel speed sensors 88 can be processed by one or both of the wheel speed sensors 88 or by the controller 26 to indicate a rotational velocity and direction of the respective drive wheels 20L, 20R. The wheel speed sensors 88 can be any type of sensor capable of providing the appropriate data.

Electrical communication lines and electrical power supply lines (not numbered) can connect the controller 26 to the other components and systems of the drive-by-wire system 10. Electrical communication can be either one-way communication or two-way communication and can be networked or not networked. The controller 26, the operator LED indicator driver unit 108, the ultrasonic sensor/LiDAR processing unit 110 and the vision system processing unit 112 also can be referred to as an electronic control unit (ECU) or as a central processing unit. the controller 26 and the units 108, 110, 112 can include a processor and a memory storage device. The controller 26 and the units 108, 110, 12 can be configured with hardware and/or software to perform the task(s) described above.

Figure 18:
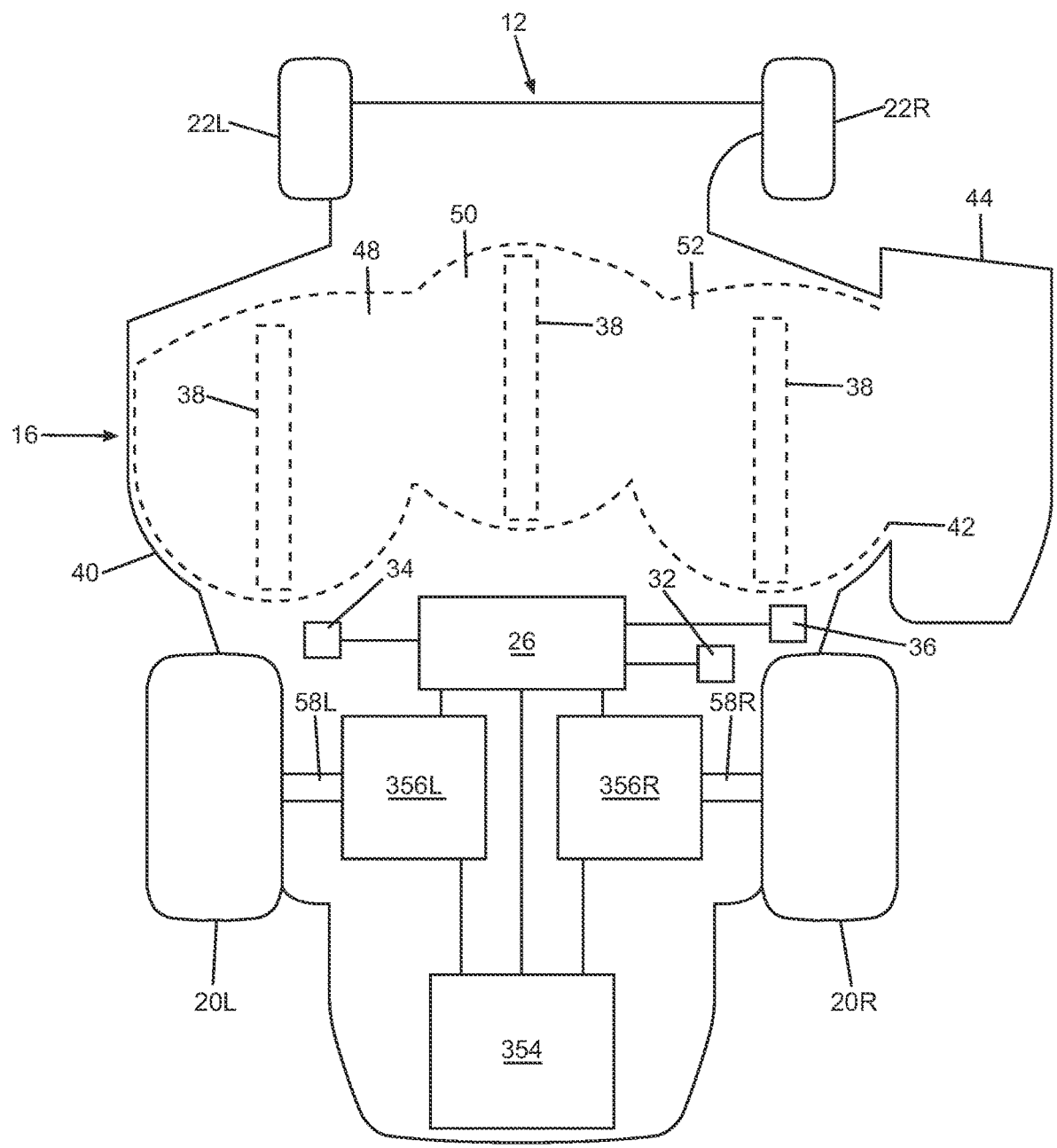
FIG. 18 is a schematic view of a second embodiment of a lawnmower that includes a drive-by-wire system made in accordance with principles of the disclosed subject matter.

FIG. 18 depicts an alternate embodiment of a lawnmower 312 that can include the drive-by-wire system 10 described above with respect to FIGS. 1-17. Instead of the power source 54 of FIG. 1 being configured as an internal combustion engine or a hybrid of an internal combustion engine, or an electric motor, the lawnmower 312 can include a power source 354 that is configured as a battery assembly. Further, instead of the HSTs 56L, 56R, the lawnmower 312 can include a pair of electric motors 356L, 356R. The controller 26 can be in electrical communication with the power source 354 and can be configured to selectively distribute power from the power source 354 to each of the electric motors 356L, 356R. The controller 26 can be configured to operate the electric motors 356L, 356R in accordance with the first mode and second mode of the drive-by-wire system 10 described above.

While certain embodiments of the invention are described above, it should be understood that the invention can be embodied and configured in many different ways without departing from the spirit and scope of the invention.

For example, embodiments are disclosed above in the context of lawnmower 12 shown in FIG. 1. However, embodiments are intended to include a drive-by-wire system for any type of vehicle. For example, the drive-by-wire system 10 can be used with a skid steer vehicle or a vehicle that is propelled by two or more tracks.

Instead of the configuration shown in FIG. 6, the controller 26 can be configured such that the controller 26 determines the forward and reverse directions from the left handle 30 instead of the right handle 28, and determines the turning direction from the right handle 28 instead of the left handle 30 when in the second mode. Further, the drive-by-wire system 10 can include one or more inputs that enable the operator to selectively customize which of the control levers 28, 30 determines the forward and reverse directions and which of the handles 28, 30 controls the turning direction in the second mode.

Instead of mounting the mode selector 36 on the control panel 80, exemplary embodiments can include a mode switch on one of the control levers 28, 30.

Instead of the control levers 28, 30 described above, exemplary operator inputs can include a pair of joysticks, one on each side the seat 18, and mounted on or adjacent to a respective fender of the lawnmower 12.

Instead of mounting the automatic turn buttons 84, 86 on the left handle 30, the buttons 84, 86 can be mounted on the control panel 80.

The control system could be configured to allow automatic turning in accordance with the first mode. In this configuration, the automatic turn feature could be limited to operate when the control levers are both within a predetermined threshold of the maximum travel. The speed of the machine, and the speed of the turn, can be controlled with the aforementioned rotary knob or lever mounted to the handle.

The LED indicator strips could be inset or otherwise located on the handle itself, or mounted to a secondary structure attached to the handle (above or in front of the handle).

The LED indicator strips could be located remotely on the front of the machine, above a windscreen, inside an operator's helmet, or along the top or bottom of an operator's glasses. The LED indicator display functions could be emulated using an augmented reality display for the operator.

What is claimed is:

1. A drive-by-wire system for a vehicle including a first motor and a second motor, the drive-by-wire system comprising:
    a first operator input configured to transmit a first signal;
    a second operator input configured to transmit a second signal; and
    a controller in electrical communication with the first operator input and the second operator input, and configured to,
        determine one of a plurality of first conditions based on the first signal, the plurality of first conditions includes a first neutral condition and a plurality of first drive conditions,
        determine one of a plurality of second conditions based on the second signal, the plurality of second conditions includes a second neutral condition and a plurality of second drive conditions,
        in a first mode,
            cause the first motor to be idle when the controller determines the first neutral condition,
            cause the second motor to be idle when the controller determines the second neutral condition,
            drive the first motor at a first speed and in a first direction that correspond directly to the first signal when the controller determines one of the first drive conditions, and
            drive the second motor at a second speed and in a second direction that correspond directly to the second signal when the controller determines one of the second drive conditions; and
        in a second mode,
            drive the first motor and the second motor in a same direction and at a same speed when the controller determines the second neutral condition and one of the first drive conditions; and
            drive the first motor and the second motor at different speeds and in one of the same direction and an opposite direction when the controller determines one of the first drive conditions and one of the second drive conditions.

2. The drive-by-wire system according to claim 1, wherein the controller is configured to, in the second mode, cause the first motor and the second motor to be idle when the controller determines the first neutral condition.

3. The drive-by-wire system according to claim 1, wherein
    the plurality of second drive conditions includes a zero-turn radius condition, and
    the controller is configured to, in the second mode, drive the first motor at a turning speed in one of a forward direction and a reverse direction and drive the second motor at the turning speed and in a different one of the forward direction and the reverse direction when the controller determines the zero-turn-radius condition from the second signal and any one of the first drive conditions from the first signal.

4. The drive-by-wire system according to claim 1, wherein
the different speeds include an inside drive speed and an outside drive speed,
the controller is configured to, in the first mode,
determine the first direction and the first speed directly from the first signal, and
determine the second direction and the second speed directly from the second signal,
the controller is configured to, in the second mode,
determine the same speed directly from the first signal and the same direction directly from the first signal,
determine one of the first motor and the second motor as an inside motor based on the second direction signal,
determine a different one of the first motor and the second motor as an outside motor based on the second direction signal,
determine the inside drive speed and direction based on the second signal,
determine the outside drive speed directly from the first speed signal, and
when the controller drives the first motor and the second motor at different speeds, the controller drives the inside motor at the inside drive speed and the outside motor at the outside drive speed.

5. The drive-by-wire system according to claim 4, further comprising:
a drive speed selector in electrical communication with the controller and configured to output a signal indicative of a maximum drive speed, wherein
the first operator input includes a first handle and a first position sensor,
the second operator input includes a second handle and a second position sensor,
the first handle and second handle pivot from a respective neutral position to each of a respective first range of positions and pivot from the respective neutral position to each of respective second range of positions,
the drive speed selector is mounted on one of the first handle and the second handle,
in the first mode, the controller is configured to,
determine a first requested drive speed from the first signal and a second requested drive speed from the second signal,
compare the maximum drive speed to each of the first requested drive speed signal and the second requested drive speed signal,
cause the first motor to operate at the first requested drive speed when the first requested drive speed is less than the maximum drive speed,
cause the second motor to operate at the second requested drive speed when the second requested drive speed is less than the maximum drive speed,
cause the first motor to operate at the maximum drive speed when the first requested drive speed is equal to or greater than the maximum drive speed, and
cause the second motor to operate at the maximum drive speed when the second requested drive speed is equal to or greater than the maximum drive speed, and
in the second mode, the controller is configured to,
determine a requested drive speed from the first signal,
compare the maximum drive speed to requested drive speed signal,
cause each of the first motor and the second motor to operate at the requested drive speed when the requested drive speed is less than the maximum drive speed,
cause each of the first motor and the second motor to operate at the maximum drive speed when the requested drive speed is equal to or greater than the maximum drive speed.

6. The drive-by-wire system according to claim 1, further comprising:
a mode selector electrically connected to the controller and configured to output a mode signal, and
the controller is configured to,
determine whether the mode signal is indicative of a first mode request or a second mode request,
operate according to the first mode when the controller determines that the mode signal corresponds to the first mode request, and
operate according to the second mode when the controller determines that the mode signal corresponds to the first mode request.

7. The drive-by-wire system according to claim 1, wherein
the first operator input includes a first handle and a first position sensor,
the second operator input includes a second handle and a second position sensor,
the first handle and second handle pivot from a respective neutral position to each of a respective first range of positions and pivot from the respective neutral position to each of respective second range of positions,
the controller is configured to determine a corresponding one of the first drive conditions when the first handle is in the respective first range or the respective second range, and the first neutral condition when the first handle is in the respective neutral position, and
the controller is configured to determine a corresponding one the second drive conditions when the second handle is in the respective first range or the respective second range, and the second neutral condition when the second handle is in the respective neutral position.

8. The drive-by-wire system according to claim 7, wherein
the second handle includes an automated turn switch configured to output a turn direction signal, and
the controller is configured to, in the first mode or the second mode,
determine the first speed that directly corresponds to the first signal and a third speed that is less than the first speed and based on the first signal and the turn direction signal when the controller receives the first signal and the turn signal from the automated turn switch and determines the second neutral condition from the second signal,
drive the first motor at the first speed and the second motor at the third speed when the controller receives the first signal and the turn signal from the automated turn switch,
determine a current orientation of the lawnmower while the first motor is driven at the first speed and the second motor is driven at the third speed,
drive the first motor and the second motor according to the first signal the second signal after the current orientation corresponds to a predetermined orientation, monitor the first signal and the second signal when the controller determines that the current orientation is less than or equal to the predetermined orientation, drive the first motor and the second motor according to a selected one of the first mode and the second mode when the controller determines the first neutral condition from the first signal or one of the second drive conditions from the second signal.

9. A zero-turn-radius lawnmower comprising:

the drive-by-wire system according to claim 1;

a frame;

a mower deck suspended from the frame and including at least one cutting chamber and at least one blade rotatably mounted in the cutting chamber;

the first motor and the second motor;

a first wheel connected to the frame and the first motor; and a second wheel connected to the frame and the second motor.

10. The zero-turn-radius lawnmower according to claim 9, wherein the first operator input includes a first handle and a first position sensor, the first sensor is configured to transmit the first signal, the second operator input includes a second handle and a second position sensor, the second sensor is configured to transmit the second signal, the first handle includes a plurality of first light emitting diodes and the second handle includes a plurality of second light emitting diodes, the controller is configured to, determine, in the first mode, a first turning direction when the first speed is less than the second speed and a second turning direction when the first speed is greater than the second speed, determine, in the second mode, one of the first turning direction and the second turning direction based on the second signal, illuminate the plurality of first light emitting diodes and the plurality of second light emitting diodes in a first scrolling pattern that is indicative of the first turning direction when the controller determines the first turning direction, and illuminate the plurality of first light emitting diodes and the plurality of second light emitting diodes in a second scrolling pattern that is indicative of the second turning direction when the controller determines the second turning direction.

11. The zero-turn-radius lawnmower according to claim 9, further comprising:

an obstacle detection system configured to, scan a first zone in a path of travel of the vehicle and transmit a warning signal when an obstacle is detected in the first zone, scan a second zone in the path of travel of the vehicle and transmit a stop signal when the obstacle is detected in the second zone, the second zone is located between a rear end of the lawnmower and the first zone, wherein the controller is configured to, cause an audible warning message when the controller receives the warning signal, and cause the first motor and the second motor to be idle when the controller receives the stop signal.

12. The zero-turn-radius lawnmower according to claim 11, wherein the first zone has a first default size and the second zone has a second default size, the obstacle detection system is configured to, obtain image data of a space behind the lawnmower that is beyond the first zone such that the first zone is located between the space and the lawnmower, compare the image data to a predetermined obstacle, increase the first zone from the first default size to a first enlarged size that is larger than the first default size when the obstacle detection system determines that the image data corresponds to the predetermined obstacle, and increase the second zone from the second default size to a second enlarged size that is larger than the second default size when the obstacle detection system determines that the image data corresponds to the predetermined obstacle.

13. The zero-turn-radius lawnmower according to claim 11, wherein the first operator input includes a first handle and a first position sensor, the first sensor is configured to transmit the first drive signal, the second operator input includes a second handle and a second position sensor, the second sensor is configured to transmit the second drive signal, each of the first handle and the second handle includes a plurality of light emitting diodes, the warning signal includes position data indicative of a position of the obstacle relative to the lawnmower, and the controller is configured to illuminate the plurality of light emitting diodes located on the first handle and the plurality of light emitting diodes on the second handle in a predetermined pattern and a predetermined color that is indicative of the position of the obstacle relative to the lawnmower.

14. The zero-turn-radius lawnmower according to claim 9, further comprising:

a gyroscope in electrical communication with the controller; and an accelerometer in electrical communication with the controller, wherein the first operator input includes a first handle and a first position sensor, the first sensor is configured to transmit the first drive signal, the second operator input includes a second handle and a second position sensor, the second sensor is configured to transmit the second drive signal, each of the first handle and the second handle includes a plurality of light emitting diodes, the controller is configured to, determine a tilt angle of the lawnmower based on the gyroscope signal and the accelerometer signal, compare the tilt angle with a predetermined threshold angle, and illuminate the plurality of light emitting diodes in a manner that is indicative of a tilt direction of the lawnmower when the tilt angle exceeds the predetermined threshold.

15. The zero-turn-radius lawnmower according to claim 9, further comprising:

a first hydrostatic transmission that includes the first motor; and a second hydrostatic transmission that includes the second motor.

16. The zero-turn-radius lawnmower according to claim 9, wherein each of the first motor and the second motor is an electric motor.

17. A drive-by-wire system for a lawnmower including a first motor and a second motor, the drive-by-wire system comprising:
a first operator input configured to transmit a first signal;
a second operator input configured to transmit a second signal; and
a mode selector configured to output a mode signal, and
a controller in electrical communication with the mode selector, the first operator input, and the second operator input, and configured to,
determine one of a plurality of first conditions based on the first signal, the plurality of first conditions includes a first neutral condition and a plurality of first drive conditions,
determine one of a plurality of second conditions based on the second signal, the plurality of second conditions includes a second neutral condition and a plurality of second drive conditions,
determine whether the mode signal is indicative of a first mode request or a second mode request,
operate in a first mode when the controller determines that the mode signal corresponds to the first mode request, and
operate in a second mode when the controller determines that the mode signal corresponds to the second mode request,
in the first mode,
drive the first motor at a first speed and in a first direction that correspond directly to the first signal when the controller determines one of the first drive conditions,
drive the second motor at a second speed and in a second direction that correspond directly to the second signal when the controller determines one of the second drive conditions,
cause the first motor to be idle when the controller determines the first neutral condition, and
cause the second motor to be idle when the controller determines the second neutral condition; and
in the second mode,
drive the first motor and the second motor in a same direction and at a same speed when the controller determines the second neutral condition and one of the first drive conditions,
drive the first motor at a first turning speed and in the same direction and the second motor at a second turning speed and in one of the same direction and an opposite direction when the controller determines one of the first drive conditions and one of the second drive conditions, and
cause the first motor and the second motor to be idle when the controller determines the first neutral condition.

18. The drive-by-wire system according to claim 17, wherein
the plurality of second drive conditions includes a zero-turn radius condition,
the controller is configured to, in the first mode,
determine the first direction directly from the first signal and the first speed directly from the first signal, and
determine the second direction directly from the second signal and the second speed directly from the second signal, the controller is configured to, in the second mode,
determine the same speed directly from the first signal and the same direction directly from the first signal,
determine one of a first turning direction and a second turning direction directly from the second signal,
determine the first turning speed based on the second signal when the controller determines the first turning direction,
determine the second turning speed directly from the first signal when the controller determines the first turning direction,
determine the second turning speed based on the second signal when the controller determines the second turning direction, and
determine the first turning speed directly from the first signal when the controller determines the second turning direction, and
drive one of the first motor and the second motor at a zero-turn-radius speed in a forward direction and a different one of the first motor and the second motor at the zero-turn-radius speed and in a reverse direction when the controller determines the zero-turn-radius condition from the second signal and any one of the first drive conditions from the first signal.

19. The drive-by-wire system according to claim 17, further comprising:
an automated turn switch, wherein
the controller is configured to, in the first mode or the second mode,
drive the first motor at the first speed and the second motor at a third speed that is greater than the first speed when the controller receives a turn signal from the automated turn switch and determines the second neutral condition from the second signal,
determine a current orientation of the lawnmower while the first motor is driven at the first speed and the second motor is driven at the third speed, and
drive the first motor and the second motor at the same speed when the current orientation of the lawnmower is equal to a predetermined orientation.

20. A drive-by-wire system for a lawnmower including a first motor selectively and a second motor, the drive-by-wire system comprising:
a first handle and a second handle, each of the first and second handles is movable into a first range, a second range, and a neutral position that is separate from the first range and the second range; and
a controller in electrical communication with the first handle and the second handle, the controller is configured to,
in a first operation mode,
drive the first motor when the first handle is in the first range or the second range,
drive the second motor when the second handle is in the first range or the second range,
cause the first motor to be idle when the first handle is in the neutral position, and
cause the second motor to be idle when the second handle is in the neutral position
in a second operation mode,
drive the first motor and the second motor when the second handle is the neutral position and the first handle is in the first range or the second range.

* * * * *